US010108901B2

(12) United States Patent
Beavers et al.

(10) Patent No.: US 10,108,901 B2
(45) Date of Patent: Oct. 23, 2018

(54) SYSTEMS AND METHODS TO USE A MOBILE COMMUNICATIONS DEVICE FOR PARKING FACILITY ACCESS

(71) Applicants: Jay Curtis Beavers, Duvall, WA (US); Helene Marie Julie Martineaud, Seattle, WA (US)

(72) Inventors: Jay Curtis Beavers, Duvall, WA (US); Helene Marie Julie Martineaud, Seattle, WA (US)

( * ) Notice: Subject to any disclaimer, the term of this patent is extended or adjusted under 35 U.S.C. 154(b) by 0 days.

(21) Appl. No.: 15/457,751

(22) Filed: Mar. 13, 2017

(65) Prior Publication Data

US 2017/0300803 A1    Oct. 19, 2017

Related U.S. Application Data

(60) Provisional application No. 62/307,534, filed on Mar. 13, 2016.

(51) Int. Cl.
  *B60Q 1/48*    (2006.01)
  *G06K 19/14*    (2006.01)
  *H04W 4/021*    (2018.01)
  *G07C 9/00*    (2006.01)
  *G07B 11/00*    (2006.01)
  *G07B 15/00*    (2011.01)

(52) U.S. Cl.
  CPC ........... *G06K 19/145* (2013.01); *G07B 11/00* (2013.01); *G07B 15/00* (2013.01); *G07C 9/00119* (2013.01); *G07C 9/00126* (2013.01); *H04W 4/021* (2013.01)

(58) Field of Classification Search
  CPC ................................ G07B 15/00; G07B 15/02
  USPC .......... 340/932.2, 933, 686.1, 5.8, 5.81, 5.7, 340/5.71; 705/13
  See application file for complete search history.

(56) References Cited

U.S. PATENT DOCUMENTS

| 9,111,274 B2 * | 8/2015 | Wikander | G06Q 20/127 |
| 2007/0083424 A1 * | 4/2007 | Lang | G06Q 10/02 |
| | | | 705/13 |
| 2015/0025947 A1 * | 1/2015 | Dutta | G06Q 10/02 |
| | | | 705/13 |
| 2015/0095123 A1 * | 4/2015 | Wenninger | G07B 15/04 |
| | | | 705/13 |
| 2016/0042575 A1 * | 2/2016 | Ganguly | G07B 15/02 |
| | | | 705/13 |
| 2017/0249625 A1 * | 8/2017 | Vossoughi | G06Q 20/3223 |

* cited by examiner

*Primary Examiner* — Toan N Pham

(57) ABSTRACT

A computer-implemented method leverages the capabilities present in common mobile communications devices—RF transceivers, Internet connectivity, payment system, geolocation system, notification system, and user interface—to simplify and reduce overhead from the parking experience. Furthermore, this method utilizes distributed authentication and authorization and multi-path queued message delivery to provide this experience when cellular or WiFi Internet connectivity is absent in the parking facility, simplifying and reducing the cost of deployment.

18 Claims, 32 Drawing Sheets

SYSTEMS AND METHODS TO USE A MOBILE COMMUNICATIONS DEVICE FOR PARKING FACILITY ACCESS

CROSS-REFERENCE TO RELATED APPLICATIONS

This application claims benefit under 35 U.S.C. 119 to U.S. application Ser. No. 62/307,534, filed on Mar. 13, 2016, which is incorporated herein by reference in its entirety.

BACKGROUND

Parking is a complicated process involving stopping at a barrier, taking a ticket, and when leaving, presenting a ticket to a person or automated reader, and presenting cash or credit card to pay for the parking. A driver may have to handle many items, and the process takes time out of her or his day. Conventional parking systems are based on a credit card and paper ticket with magnetic stripe, or are based on a mobile phone application, which is not location aware. Thus, a driver may be required to start an application manually and physically place the cell phone out of the vehicle's window to scan a quick response (QR) code or touch a near field communication (NFC) reader. Additionally, conventional parking facility systems typically utilize direct connections between the barrier management system, payment system, and their authorization, payment, and management services, which decreases reliability when connectivity failures occur and increases complexity and cost of deploying the systems. Furthermore, parking facilities are not equipped to identify high-occupancy vehicles (e.g., a carpool) thus failing to implement effective programs to support, reward, or enforce carpooling. Systems and methods are thus needed to ease the burden and distractions of parking facility transactions and to support carpooling behaviors which improve limited-resources efficiency use and limits pollution due to traffic emissions.

BRIEF SUMMARY

The present systems and methods enable a vehicle to wirelessly acquire permission to enter and to exit a parking facility in which financial transactions are levied against the vehicle in proportion to the residence time the vehicle occupies the parking facility or by fixed charges on a per diem or other timely basis or by pre-authorized free access (e.g., validated parking, employee parking, etc.). an in which the levied financial transaction may be split between the detected occupants of the vehicle. An authorization service may be utilized to store records for long term parking, such as but not limited to monthly parking subscriptions, employee parking passes, and residential parking passes. The authorization service may issue validation tickets for parking facilities that have relationships with retail businesses which grant reduced price parking for business customers or for parking facilities implementing or supporting carpooling programs which grant reduced price parking to carpoolers.

The disclosed systems and methods may utilize the capabilities present in common mobile communications devices—radiofrequency (RF) transceivers, Internet connectivity, payment systems, geolocation systems, notification systems, and user interfaces—to simplify the parking experience and reduce driver distraction. Furthermore, the systems and methods may utilize distributed authentication and authorization and multi-path queued message delivery when cellular or WiFi Internet connectivity is absent in the parking facility, reducing the cost of deployment and operations of the system. Other advantages that the present systems and methods provide is that location-specific parking facility transactions may seamlessly work with minimum human interaction via the vehicle driver's cell phone or other wirelessly capable device to acquire and use nearby indoor location services to launch the cell phone application and utilize RF to communicate with the parking facility's entry and exit sensors from where the cell phone is located within or otherwise mounted in the vehicle.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
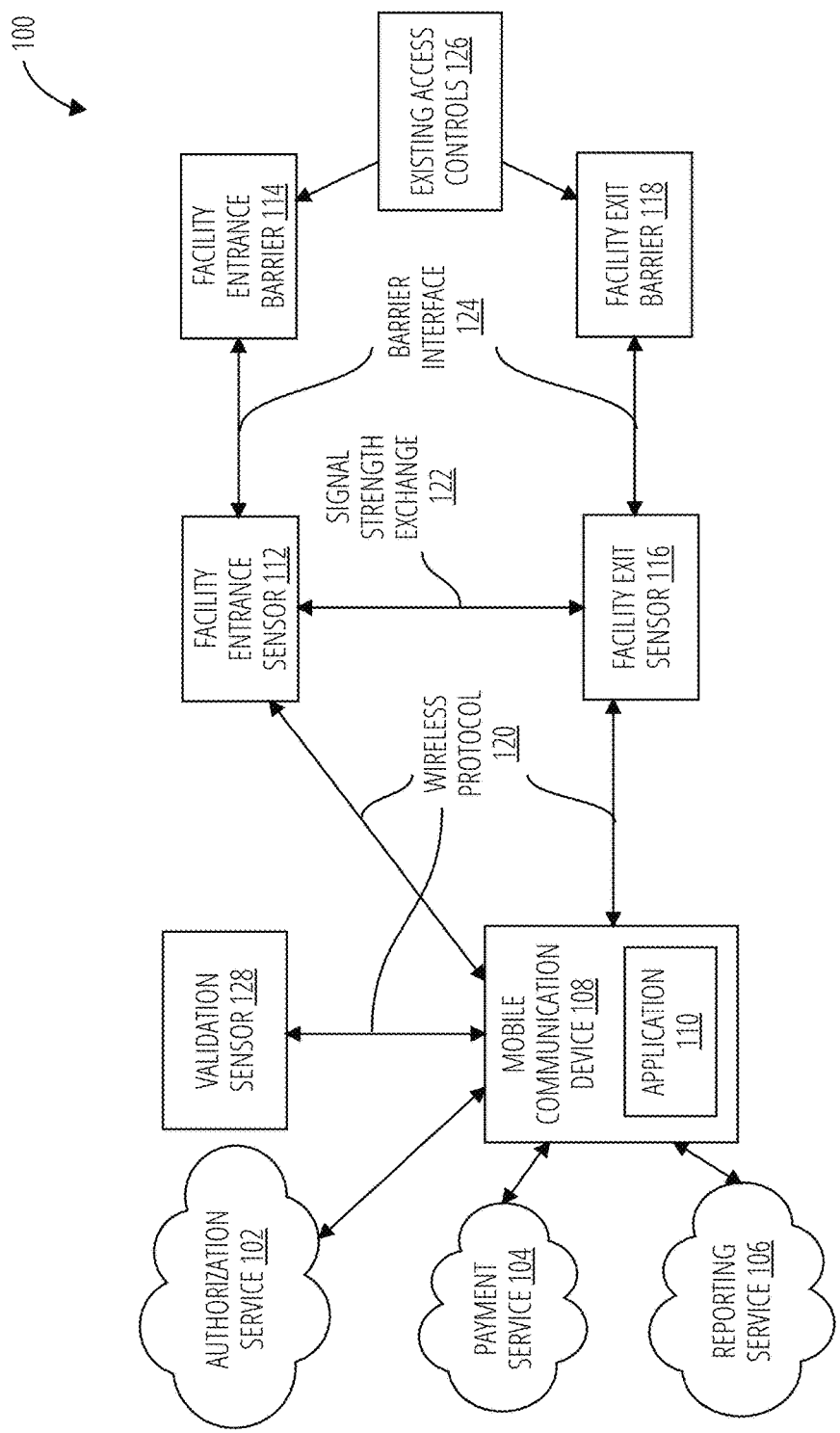
FIG. 1 illustrates an embodiment of a facility entrance and exit system 100.

"Antenna" in this context refers to an electrical device which converts electric power into radio waves, and vice versa.

"Elliptic curve cryptography" in this context refers to an approach to public-key cryptography based on the algebraic structure of elliptic curves over finite fields.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Referring to FIG. 1, a facility entrance and exit system 100 comprises an authorization service 102, a payment service 104, a reporting service 106, a mobile communication device 108, an application 110, a facility entrance sensor 112, a facility entrance barrier 114, a facility exit sensor 116, a facility exit barrier 118, a wireless protocol 120, a signal strength exchange 122, a barrier interface 124, an existing access controls 126, and a validation sensor 128.

Figure 31:
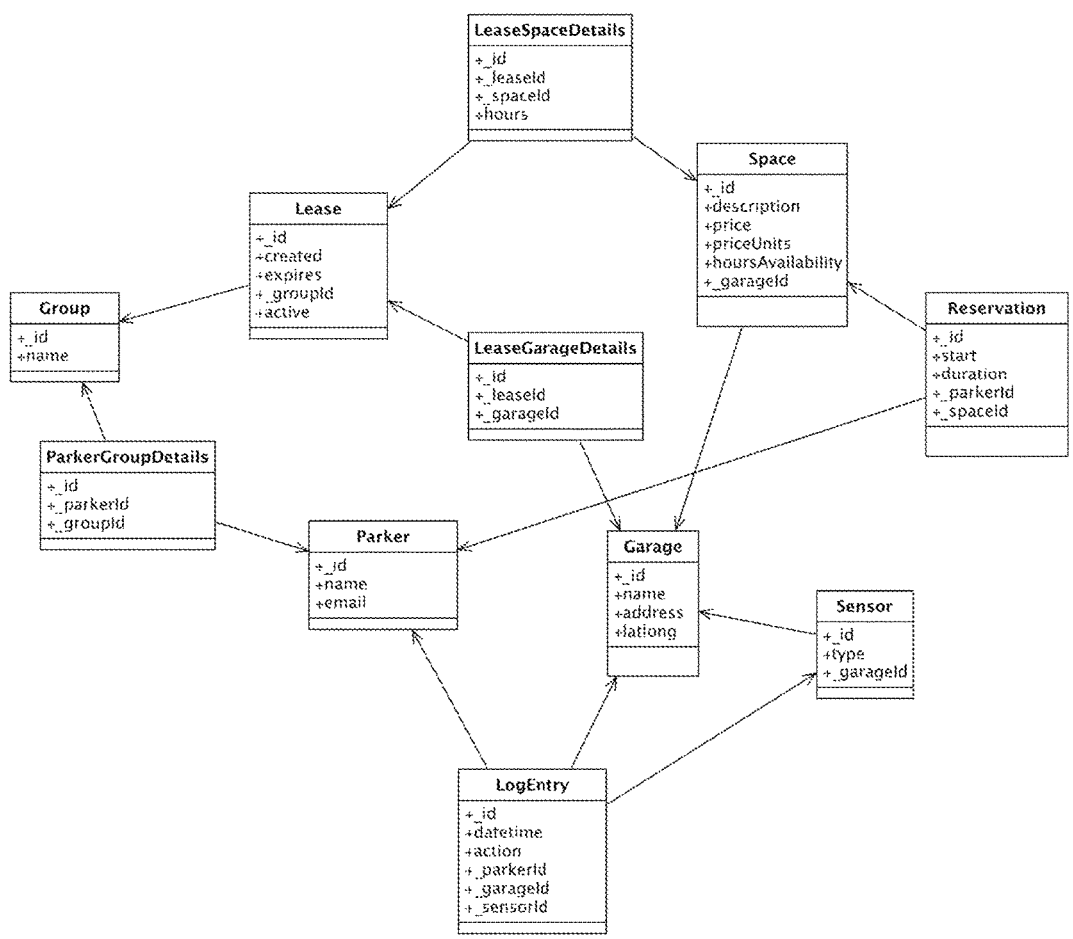
FIG. 31 illustrates an embodiment of a lease schema 3100.

The facility entrance and exit system 100 (and associated messages) may utilize the lease schema 3100 depicted in FIG. 31 to communicate information and instructions from one component to another.

The authorization service 102 sends and receives messages from the mobile communication device 108. The messages comprise records and validation tickets. The authorization service 102 stores records for long term parking, such as, but not limited to, monthly parking subscriptions, employee parking passes, and residential parking passes. The authorization service 102 issues validation tickets for parking facilities that have relationships with retail businesses. The authorization service 102 provides functionality to allow the management of the authorization records.

The payment service 104 sends and receives messages from the mobile communication device 108. The messages comprise approvals for financial transactions, along with information to facilitate the financial transaction, and confirmations of the financial transactions. The payment service 104 may be a third-party service such as Apple Pay, Google Pay, Paypal, etc., for financial transactions.

The reporting service 106 sends and receives messages from the mobile communication device 108. The reporting service 106 stores logs of parking for reporting and auditing. The reporting service 106 provides views and exports of this data for analytical purposes.

The mobile communication device 108 is a computing device such as a smart phone, personal digital assistant, or in-vehicle embedded system which contains compute capability, storage, and sensors. The mobile communication device 108 is capable of performing location services, connecting to the Internet, communicating over RF to sensors, and interacting with the driver via notifications and user interface. Some examples of location services include iOS and Android location services, which detect the approximate location of the mobile communications devices using GPS, WiFi, or Bluetooth Smart signals. The mobile communication device 108 may have a driver ID associated with its operating system or an application-level authentication system. The mobile communication device 108 sends and receives messages from the authorization service 102, the payment service 104, the reporting service 106, the facility entrance sensor 112, the facility exit sensor 116, and the validation sensor 128. The mobile communication device 108 may receive instruction from the application 110 to perform actions, such as sending a message. The mobile communication device 108 may operate the application 110, such as, activating the application 110 by transforming inputs into an activation signal for the application 110 or by sending messages to the application 110.

The application 110 provides logic to interact with the authorization service 102, the payment service 104, the reporting service 106, the validation sensor 128, the facility entrance sensor 112, the facility exit sensor 116, and the mobile communication device 108, which may be altered to interact with a driver by visual display, audio output, etc. The mobile communication device 108 may be altered to display a machine interface as depicted in FIG. 18, FIG. 19, FIG. 20, FIG. 21. FIG. 22, FIG. 23, FIG. 24, FIG. 25, FIG. 26, FIG. 27, FIG. 28, FIG. 29, and FIG. 30. The application 110 may be instantiated manually by the driver or automatically by location services on the mobile communication device 108. A geofence trigger may initiate the application 110. Examples of geofence triggers include iOS Region Monitoring APIs and Android Geofence APIs.

The facility entrance sensor 112 is a communications system of one or more micro-controllers with RF communications capabilities and input/output (TO) ports. The facility entrance sensor 112 operates firmware that broadcasts its presence to the mobile communication device 108, interacts via the wireless protocol 120 with the mobile communication device 108, enforces security via digital signatures and message parsing, and signals the facility entrance barrier 114 to open via the barrier interface 124. The facility entrance sensor 112 and the facility exit sensor 116 may not comprise a battery. In one embodiment, the facility entrance sensor 112 (or the facility exit sensor 116) comprises a solar cell to gather energy to power the facility entrance sensor 112 (or the facility exit sensor 116) from the lighting in the parking facility in which the facility entrance sensor 112 (or the facility exit sensor 116) is located. In another embodiment, current is provided by the garage barrier switch wires (of the facility entrance barrier 114 or facility exit barrier 118). The facility entrance sensor 112 (or the facility exit sensor 116) comprises a capacitor and associated circuitry to recharge the capacitor when the facility entrance barrier 114 or facility exit barrier 118 is activated.

The facility entrance barrier 114 blocks access to a parking area. The facility entrance barrier 114 may be a gate, bar, or door. The facility entrance barrier 114 may be operable via the existing access controls 126 in parallel to the facility entrance and exit system 100. The facility entrance barrier 114 opens upon approach of a vehicle if the application 110 is instantiated, either manually or via location services, and the message exchange of the wireless protocol 120 has been completed.

The facility exit sensor 116 operates similar to the facility entrance sensor 112 and may be positioned near and coupled to the facility exit barrier 118. The facility exit sensor 116 may utilize the solar cell or the capacitor (and associated circuitry), similar to the facility entrance sensor 112.

The facility exit barrier 118 blocks egress from the parking area. The facility exit barrier 118 may be a gate, bar, or door. The facility exit barrier 118 may be operable via the existing access controls 126 in parallel to this system. The facility exit barrier 118 opens upon approach of the vehicle if the application 110 is instantiated, either manually or via location services, the message exchange of the wireless protocol 120 has been completed, and the application 110 has a message authorizing the exit. The messages authorizing exit may include a monthly parking subscription, employee parking pass, residential parking pass, validated parking, or completed parking payment.

The mobile communication device 108, the facility entrance sensor 112, and the facility exit sensor 116 exchange presence information and messages with each other via wireless protocol 120. The wireless protocol 120 includes a broadcast of 'presence' to allow the location services of the mobile communication device 108 to detect proximity to the parking facility and launch the application 110. Alternatively, the mobile communication device 108 may send a local background notification to the application 110, which may then, based on user preferences, determine an action including: auto-open the garage barrier; provide a notification on the lock screen or overlay notification (if the mobile communication device 108 is unlocked); or use a voice command (through Siri, Google Assistant, or similar service) to open the garage barrier on request. The wireless protocol 120 may be an existing protocol, such as Apple iBeacon messages over Bluetooth Smart, Google Physical Web messages over Bluetooth Smart, or similar broadcast/location discovery protocols over other RF such as but not limited to the 802.15.4 or the 802.11ah set of specifications.

The wireless protocol 120 also securely exchanges messages between the application 110 and the facility entrance sensor 112 and the facility exit sensor 116. The contents of these messages may vary from facility to facility based on the specific needs of the parking facility. The messages include authorization tickets, entrance tickets, validation tickets, log data, and facility data, such as parking rates, local advertisements, special offers, etc.

Having two sensors (e.g., the facility entrance sensor 112 and the facility exit sensor 116) in different but nearby locations enables calculating entrance and exit trajectories by comparing signal strengths via the signal strength exchange 122. The signal strength exchange 122 may be used as additional information to validate vehicle positions and movement. The facility entrance sensor 112 and the facility exit sensor 116 may communicate directly with each other over RF to exchange signal strength data via the signal strength exchange 122 in order to facilitate this calculation. These calculated trajectories may be used by the firmware of the facility entrance sensor 112 and the facility exit sensor 116 as part of the entry/exit workflow and may be logged to the reporting service 106 for post-transaction security auditing.

A barrier interface 124 for the facility entrance barrier 114 and the facility exit barrier 118 may be provided from commercial barrier producers, which provide many different interfaces for signaling intent to open the barrier. The barrier interface 124 may include but is not limited to wire connection points that expect normally open or normally closed switch or communication protocols, such as RS-232. The facility entrance sensor 112 and the facility exit sensor 116 support many different I/O ports and barrier interface protocols to be compatible with a plurality of commercial barrier producers.

The existing access controls 126, such as a paper ticket dispenser, paper ticket reader, wireless key fob, NFC card scanner, or manual switch operation, may be utilized in parallel to the facility entrance and exit system 100.

The validation sensor 128 is a communications system composed of one or more micro-controllers with RF communications capabilities and I/O ports. The validation sensor 128 operates logic (e.g., a firmware) that broadcasts its presence to any mobile communication device 108 that is listening, interacts via the wireless protocol 120 with the mobile communication device 108, and communicates with the authorization service 102. The validation sensor 128 may receive validation tickets for businesses that provide parking validation for their customers. Validation may be automatic (e.g., entering the business) or conditional (e.g., with purchase). The validation sensor 128 provides an I/O port for external systems to signal conditional validation.

Figure 2:
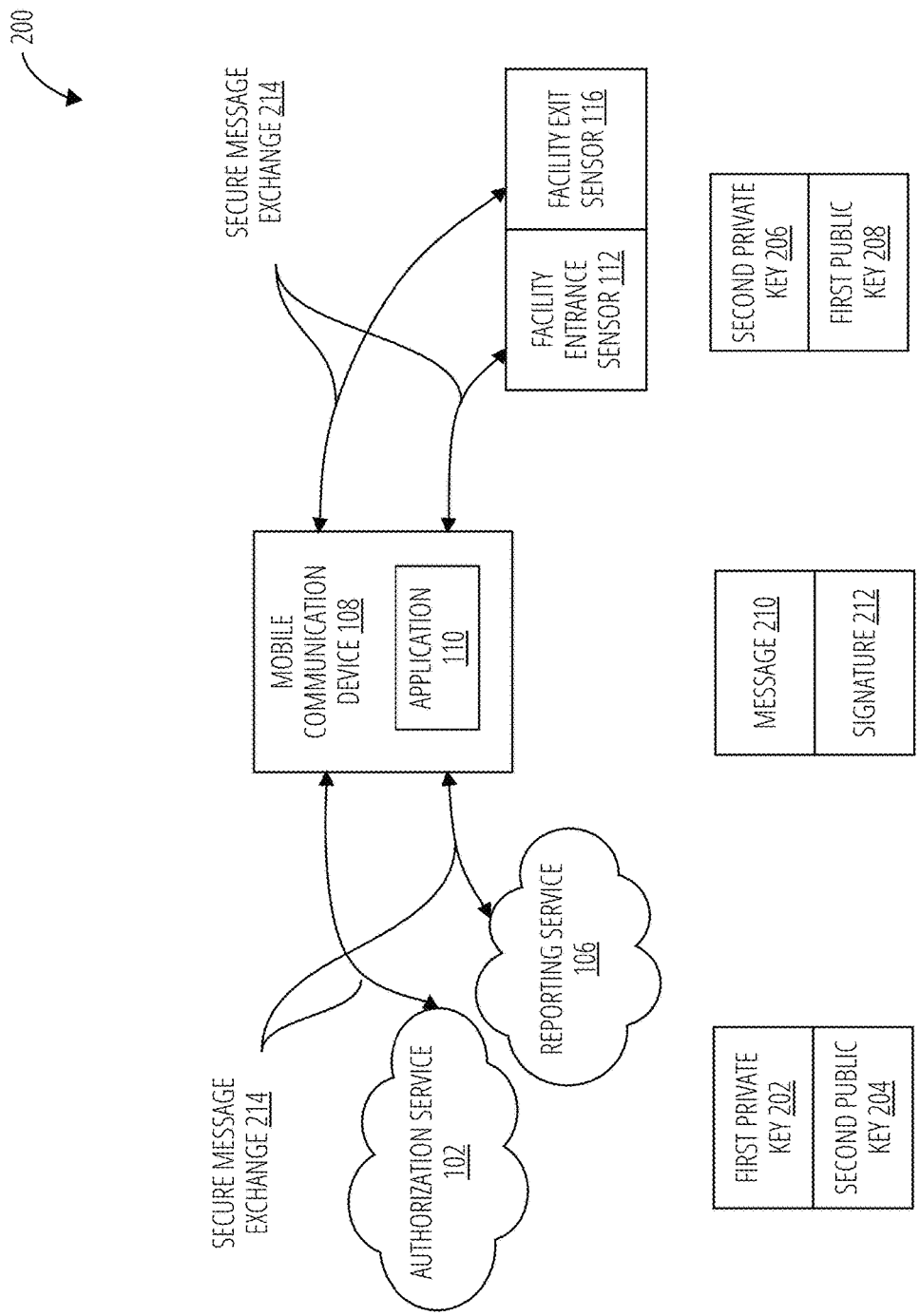
FIG. 2 illustrates an embodiment of a communications security system 200.
Figure 3:
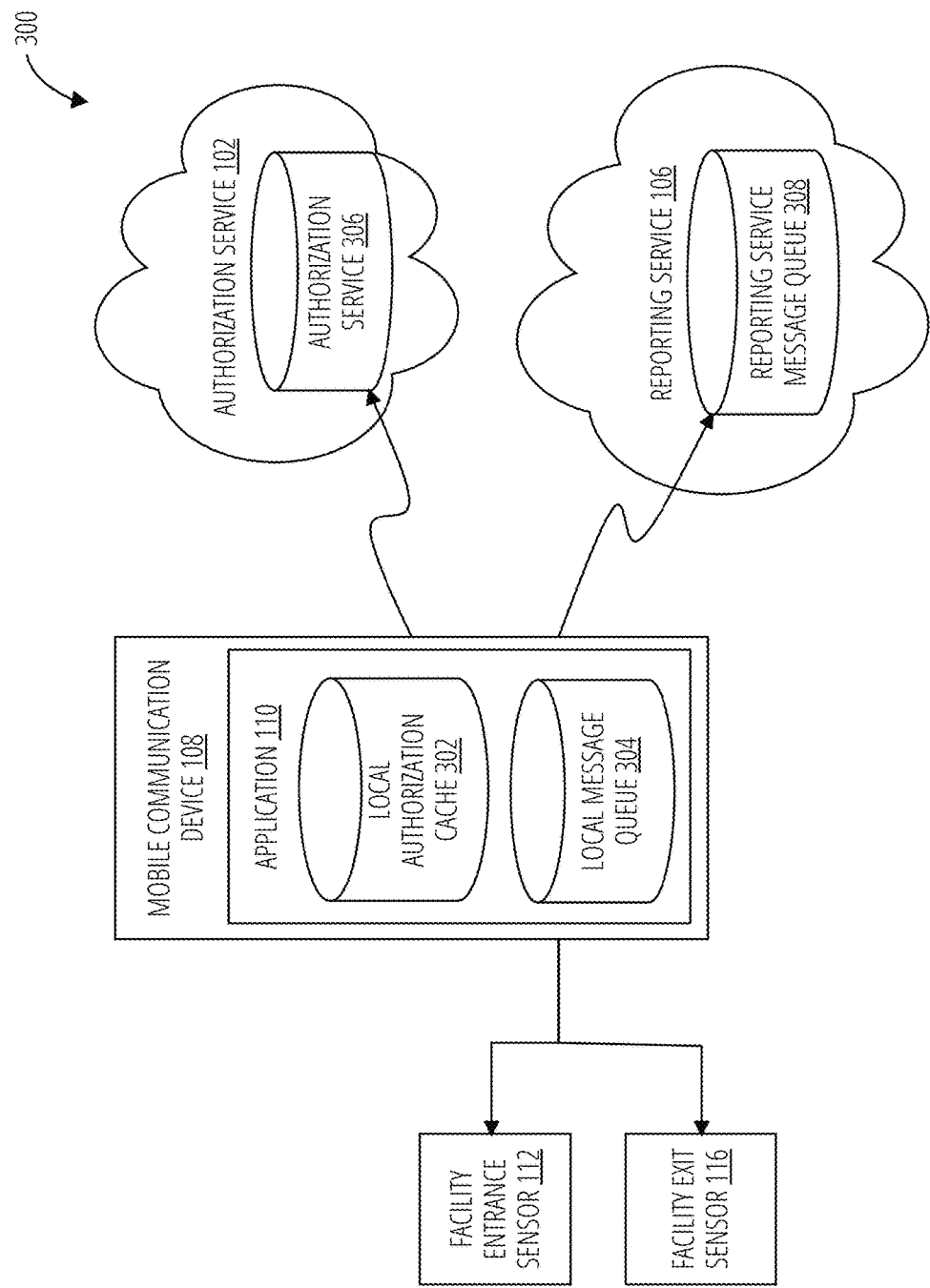
FIG. 3 illustrates an embodiment of a cloud delivery system 300.

Referring to FIG. 2, the communications security system 200 comprises an authorization service 102, a reporting service 106, a mobile communication device 108, an application 110, a facility entrance sensor 112, a facility exit sensor 116, a first private key 202, a second public key 204, a second private key 206, a first public key 208, a message 210, a signature 212, and a secure message exchange 214.

The communications security system 200 utilizes public key cryptography to secure the communications between the sensors (e.g., the facility entrance sensor 112 and the facility exit sensor 116) and the services (e.g., the authorization service 102 and the reporting service 106) through an untrusted middleman, the mobile communications mobile communication device 108, communicating over an untrusted communications channel, such as the Internet.

The message 210 and the signature 212, which may be associated to provide authenticity, are exchanged via the secure message exchange 214 between the authorization service 102, the reporting service 106, the facility entrance sensor 112, the facility exit sensor 116, the validation sensor 128, and the application 110 utilizing public key cryptography. The first private key 202, the second public key 204, the second private key 206, and the first public key 208 are pre-populated in the authorization service 102, the reporting service 106, the facility entrance sensor 112, the facility exit sensor 116, the validation sensor 128, and the application 110. The first private key 202 and the second private key 206 may be utilized in the system to limit the extent of damage of a security compromise. This embodiment utilizes PKI protocols, such as elliptical curve cryptography; however, other embodiments may utilize other protocols.

The cloud delivery system 300 comprises an authorization service 102, a reporting service 106, a mobile communication device 108, an application 110, a facility entrance sensor 112, a facility exit sensor 116, a local authorization cache 302, a local message queue 304, an authorization service control memory structure 306, and a reporting service message queue 308.

The cloud delivery system 300 utilizes message queues (e.g., the local message queue 304 and the reporting service message queue 308) and caches/control memory structures (e.g., the local message queue 304 and the authorization service control memory structure 306) to enable the cloud delivery system 300 to work when the mobile communication device 108 does not have Internet connectivity and cannot connect to the services (e.g., the authorization service 102 and the reporting service 106). The application 110 may comprise the local authorization cache 302 and the local message queue 304; the authorization service 102 may comprise the authorization service control memory structure 306; and the reporting service 106 may comprise the reporting service message queue 308.

The application 110 utilizes the local authorization cache 302 to enable the application 110 to exchange a message with the facility entrance sensor 112 and the facility exit sensor 116 under limited communication conditions, such as inside a parking facility where external cellular networks and WiFi with Internet connectivity are not accessible due to signal blockage from the structure. The local authorization cache 302 comprises messages such as authorization tickets, entrance tickets, etc., which utilize a datetime stamp to limit their validity period and have been digitally signed to prove authenticity. The application 110 determines a relevant subset of these tickets, which are downloaded from the authorization service control memory structure 306 if the authorization service 102.

The application 110 utilizes the local message queue 304 to enable the authorization service 102, the reporting service 106, the facility entrance sensor 112, and the facility exit sensor 116 to exchange messages via proxy through the connectivity of the mobile communication device 108. The local message queue 304 comprises messages such as log data, parking transactions, etc., which have been digitally signed to prove authenticity. When connectivity is available, the messages are delivered from the local message queue 304 into the reporting service message queue 308 of the reporting service 106 for further processing.

To deliver over untrusted and potentially unreliable middlemen, messages may be sent multiple times to one or more mobile communication device 108 over a period of time with a level of randomness. While one mobile communication device 108 may be compromised, a series of mobile communication device 108 are unlikely to be compromised over a random timescale.

The authorization service control memory structure 306 stores records for long term parking, such as but not limited to monthly parking subscriptions, employee parking passes, and residential parking passes.

The reporting service message queue 308 comprises messages such as log data, completed parking transactions, etc. The reporting service message queue 308 receives incoming messages from the local message queue 304 and holds them until the messages process into the storage system of the reporting service 106. The processing logic for the reporting service message queue 308 detects and removes duplicate messages.

The mobile communication device 108 acts as a communication proxy between the facility entrance sensor 112 and the facility exit sensor 116 and the authorization service 102 and the reporting service 106. However, the mobile communication device 108 may not be able to connect to the authorization service 102 and the reporting service 106. For example, the mobile communication device 108 may not have cellular connectivity or WiFi with Internet connectivity while in a parking structure that obstructs RF signals. Thus, the local storage of the mobile communication device 108 holds a message and its associated signature in the local authorization cache 302 and the local message queue 304.

Figure 4:
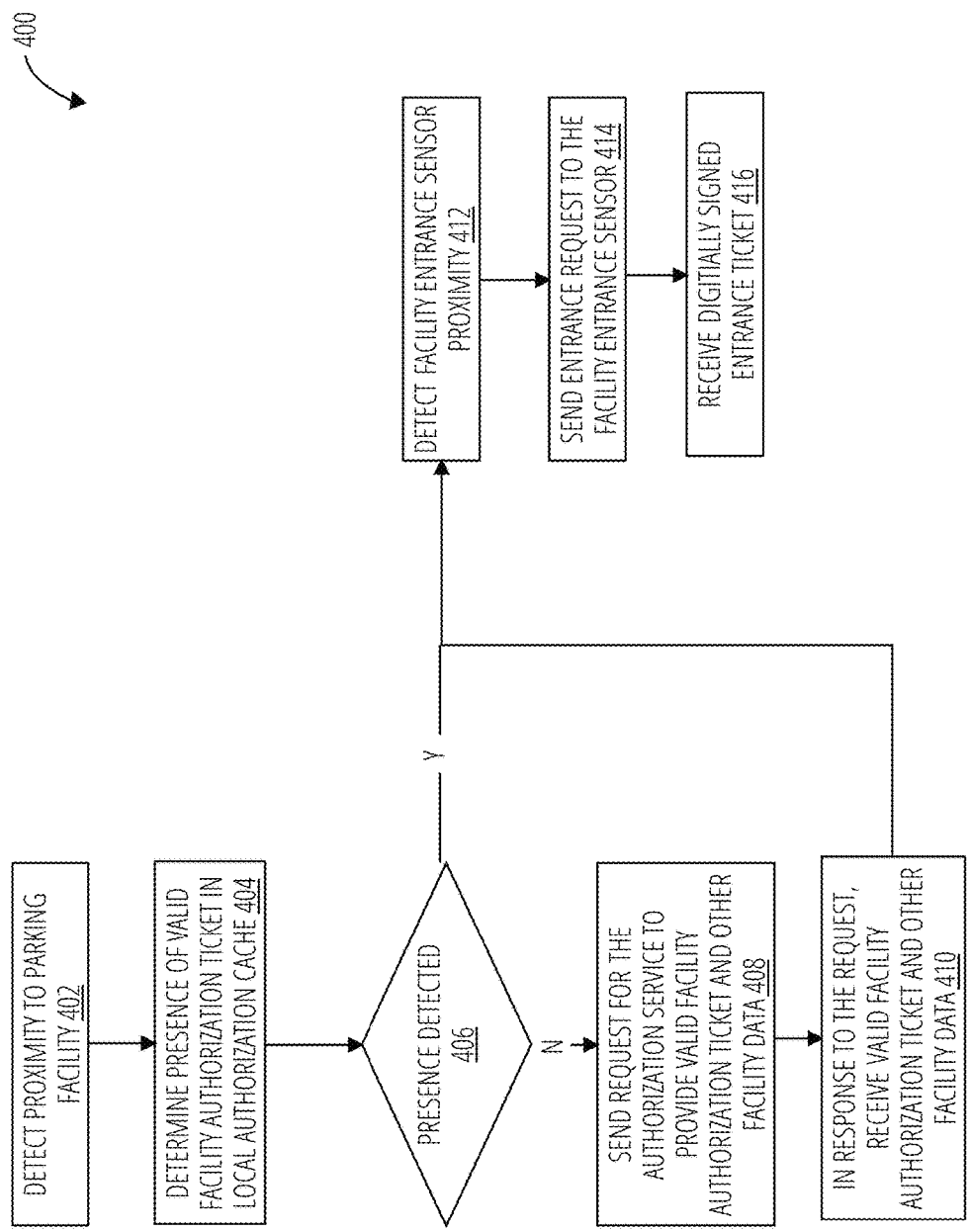
FIG. 4 illustrates an embodiment of a facility entrance method 400.

Referring to FIG. 4, the facility entrance method 400 comprises detecting a proximity to a parking facility (block 402). location service may be utilized to detect the proximity. Some examples of location services include but are not limited to iOS and Android location services which detect the approximate location of the mobile communications devices using GPS, WiFi, or Bluetooth Smart signals. A geofence trigger may initiate an application. Examples of geofence triggers include but are not limited to iOS Region Monitoring APIs and Android Geofence APIs. The presence of a valid facility authorization ticket is determined (block 404). The valid facility authorization ticket may be located in a local authorization cache. The location may be cross referenced against an index of parking facility locations and additional data, such as the ID broadcast by the facility entrance or exit sensors, may be utilized to determine the identity of the parking facility to determine the valid facility authorization ticket to detect.

The facility entrance method 400 determines whether the presence of the valid facility authorization ticket was detected (decision block 406). If not, a request is sent to the authorization service to provide valid facility authorization ticket and other facility data (block 408). In response to the request, the valid facility authorization ticket is received (block 410). Other facility data may also be received.

Once the valid facility authorization ticket is received or if the valid facility authorization was determined to be present, a facility entrance sensor proximity is detected (block 412). RF may be utilized to detect the facility entrance sensor proximity. Depending upon many factors that affect RF receiver range, such as the position of the facility entrance sensor, the position of the mobile communications device within the vehicle, and the antennas of the sensor and device, the facility entrance sensor may not be detected until the vehicle has entered the parking facility. An entrance request is sent to the facility entrance sensor (block 414). The entrance request may comprise a driver ID, the valid facility authorization ticket, and the datetime. The driver ID may be determined using an identity from the operating system of the mobile computing device or an application level authentication system. The entrance request may also comprise instruction for the facility entrance sensor to store of log of the entry, including driver ID, ticket ID, and datetime value. A digitally signed entrance ticket is received (block 416).

In some embodiments, the authorization ticket may not be present, depending on whether the driver is pre-authorized to park and if connectivity to the authorization service has been established to populate the local authorization cache. If the authorization ticket is not present, access to the parking facility may be allowed or denied depending upon the policy of the parking facility.

Clock updates may be sent to the facility sensors as the sensors do not have independent connectivity to a time service. The facility sensors may determine a quorum of input from a multiple mobile communications devices to update the clock to reduce the probability of a bad actor of maliciously resetting the clocks.

In some embodiments, the driver ID and the authorization ticket may prompt the facility entrance sensor to detect the presence of one or more other driver IDs. Once detected, entry into the facility may be allowed based on the authorization ticket and the one or more driver IDs.

In some embodiments, multiple mobile communication devices send an entrance request to the facility entrance sensor. The entrance request comprises instructions to determine that each of the mobile communication device are associated with the same vehicle (e.g., a carpool), which may occur using RF and identifying signal strength. The entrance request may further instruct the facility entrance sensor to associate the entrance ticket with the multiple mobile communication devices.

A queued log data may be received for lazy delivery to the reporting service. A subset of log entries is communicated to the current mobile communications device in range. The number of times a log entry has been communicated is tracked and the log entry is removed from sensor local storage after sufficient transmissions. The log entries are stored in the local message queue of the application and transmitted to the reporting service message queue once connectivity is available.

The facility entrance sensor may further be instructed to open the facility entrance barrier. The facility entrance sensor 112 may utilize an appropriate barrier interface.

Figure 5:
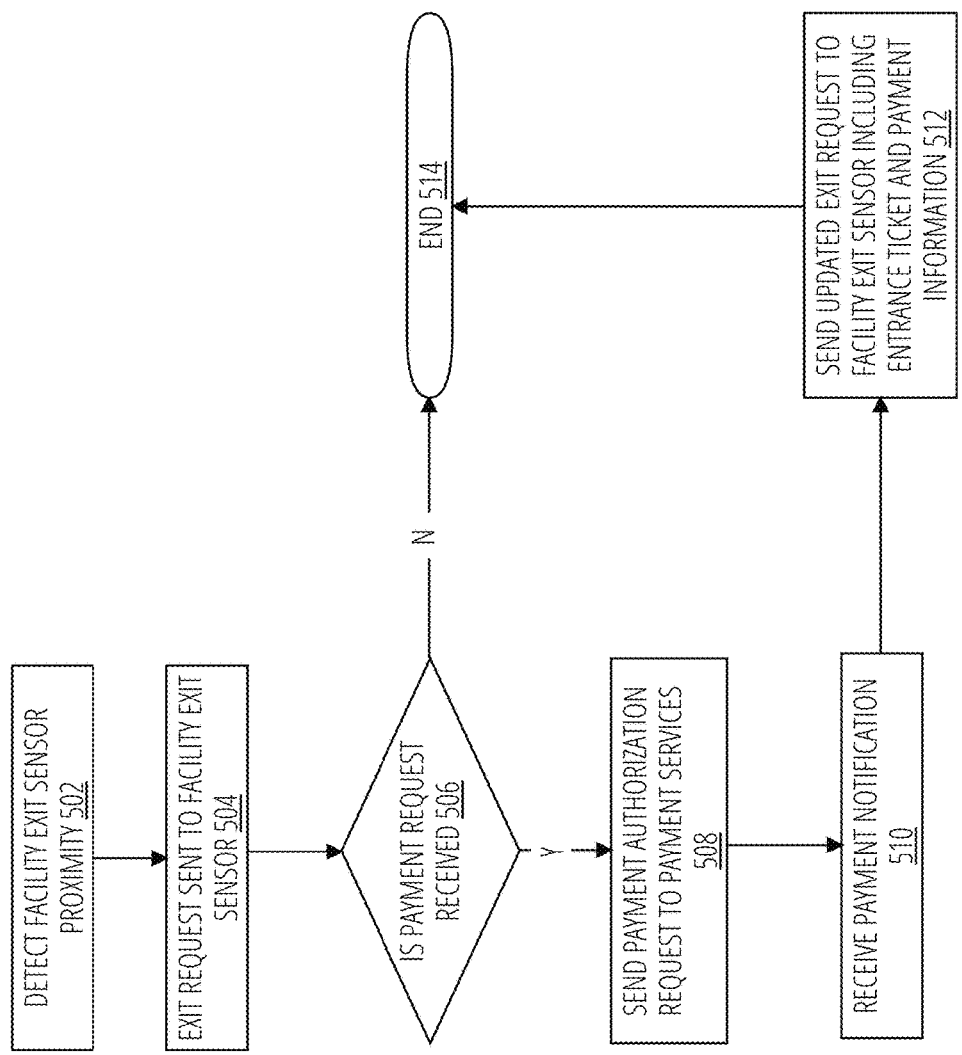
FIG. 5 illustrates an embodiment of a facility exit method 500.

Referring to FIG. 5, the facility exit method 500 a detects facility exit sensor proximity (block 502). The sensor may be detected by the application utilizing RF. An exit request is sent to the facility exit sensor (block 504). The exit request may include a digitally signed entrance ticket, an authorization ticket, a validation ticket, and a datetime. The instructions for the facility exit sensor include validating digital signatures, calculating payment, and sending payment request, if any. Whether a payment request is received is determined (decision block 506). If so, a payment authorization request is sent to a payment services (block 508). The payment authorization request includes instructions to perform one or more financial transactions and to send a payment notification of the completed financial transaction. A payment notification is received (block 510). An updated exit request to the facility exit sensor including entrance ticket and payment information. If no payment request is received or after the updated exit request is sent, the facility exit method 500 ends (done block 514).

In other embodiment, queued log data is received. which may be stored for lazy delivery to a reporting service. The exit request and update exit request may comprise instructions to send an open signal to a facility exit barrier. Using the appropriate barrier interface, the facility exit barrier is signaled. The exit request may also comprise instruction to log the interaction. Authorization and validation tickets are optionally provided, based on the specific requirements and capabilities of the parking facility. The entrance ticket's digital signature is validated using the public key of the facility exit sensor. Authorization and validation tickets, if present, are validated using the public key of the authorization service. The payment calculation is based on the specific requirements of the parking facility and, if relevant, the payment may be split in the case of an entrance ticket associated with multiple mobile communication devices.

Figure 6:
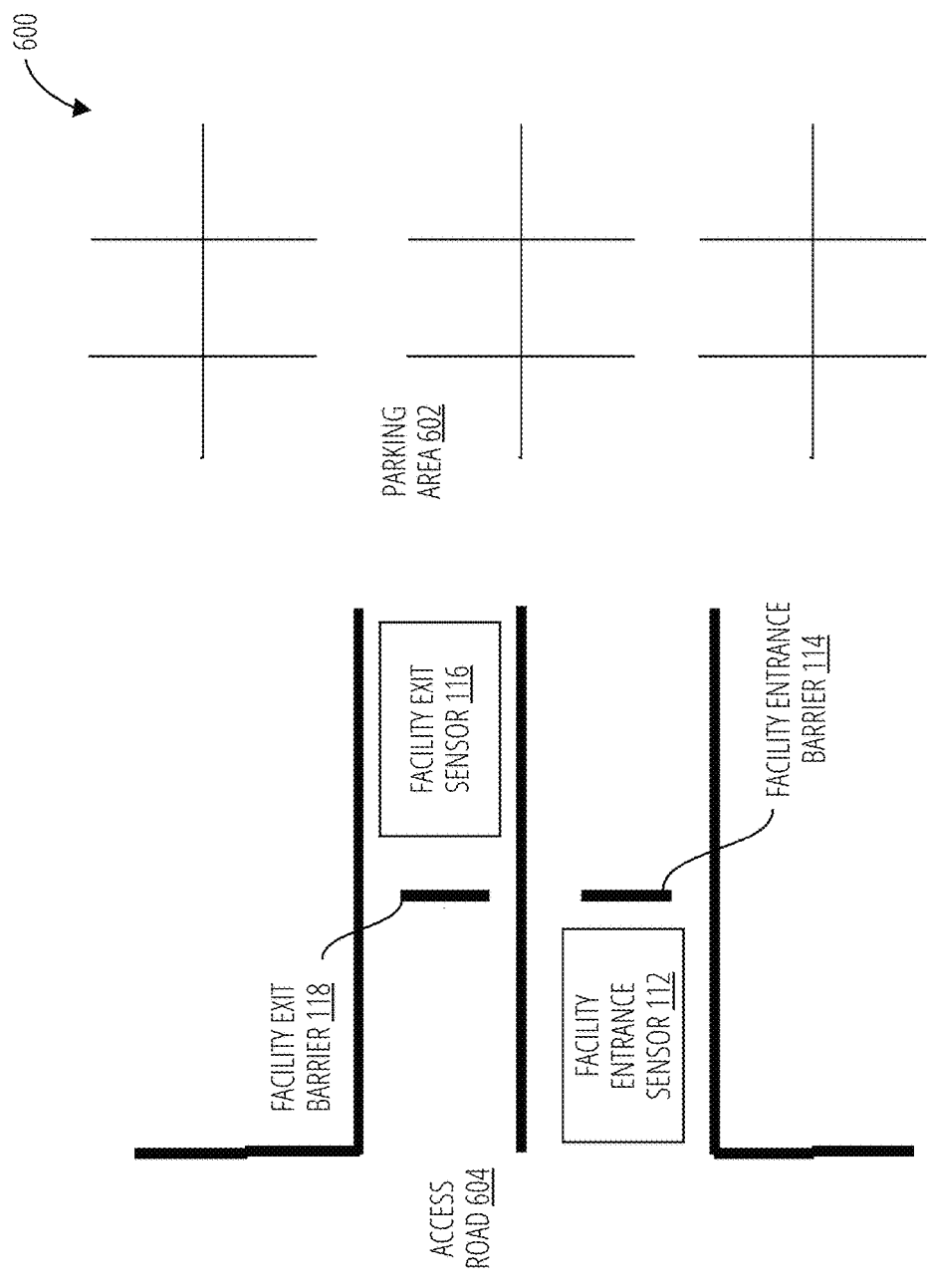
FIG. 6 illustrates an embodiment of a physical layout of a two-barrier parking facility 600.

Referring to FIG. 6, the two-barrier parking facility 600 comprises a facility entrance sensor 112, a facility entrance barrier 114, a facility exit sensor 116, a facility exit barrier 118, a parking area 602, and an access road 604.

In the two-barrier parking facility 600, each access point from the parking area 602 to the access road 604 utilizes two lanes, the first lane having the facility entrance sensor 112 and the facility entrance barrier 114 and the second lane having the facility exit sensor 116 and the facility exit barrier 118. The facility entrance barrier 114 and the facility exit barrier 118 block a vehicle from transiting from the parking area 602 and the access road 604 and from the access road 604 to the parking area 602.

The facility entrance sensor 112 and the facility exit sensor 116 are configured to have access to digital memory storage and wireless communication. The facility entrance sensor 112 and the facility exit sensor 116 are also configured to control the facility entrance barrier 114 and the facility exit barrier 118, respectively.

The facility entrance sensor 112 and the facility exit sensor 116 may communicate with a mobile communication device having an on-board application that operates the mobile communication device to communicate with the facility entrance sensor 112 and the facility exit sensor 116. The application is a microprocessor-enabled program having instructions to communicate with the facility entrance sensor 112 and the facility exit sensor 116, determine and gain permission to acquire a parking facility parking pass, and retract the entry barrier to allow passage of the vehicle to the two-barrier parking facility 600.

The application also has microprocessor-executable instructions to detect the vehicle approaching the facility exit sensor 116, and upon approaching the facility exit sensor 116, provide a wirelessly delivered communication prompt to the vehicle driver to authorize payment charge. After payment authorization, the facility exit barrier 118 is retracted to allow passage of the vehicle from the two-barrier parking facility 600.

A vehicle with an associated wireless device having access to a local intranet or the Internet may remotely gain entry to the two-barrier parking facility 600 and exit or egress from the two-barrier parking facility 600 via a wireless authentication and financial charging process. The financial charging process includes monetary transactions that are conducted in proportion to the residence time a vehicle occupies the two-barrier parking facility 600 or by other contractual arrangements with the two-barrier parking facility 600.

Figure 7:
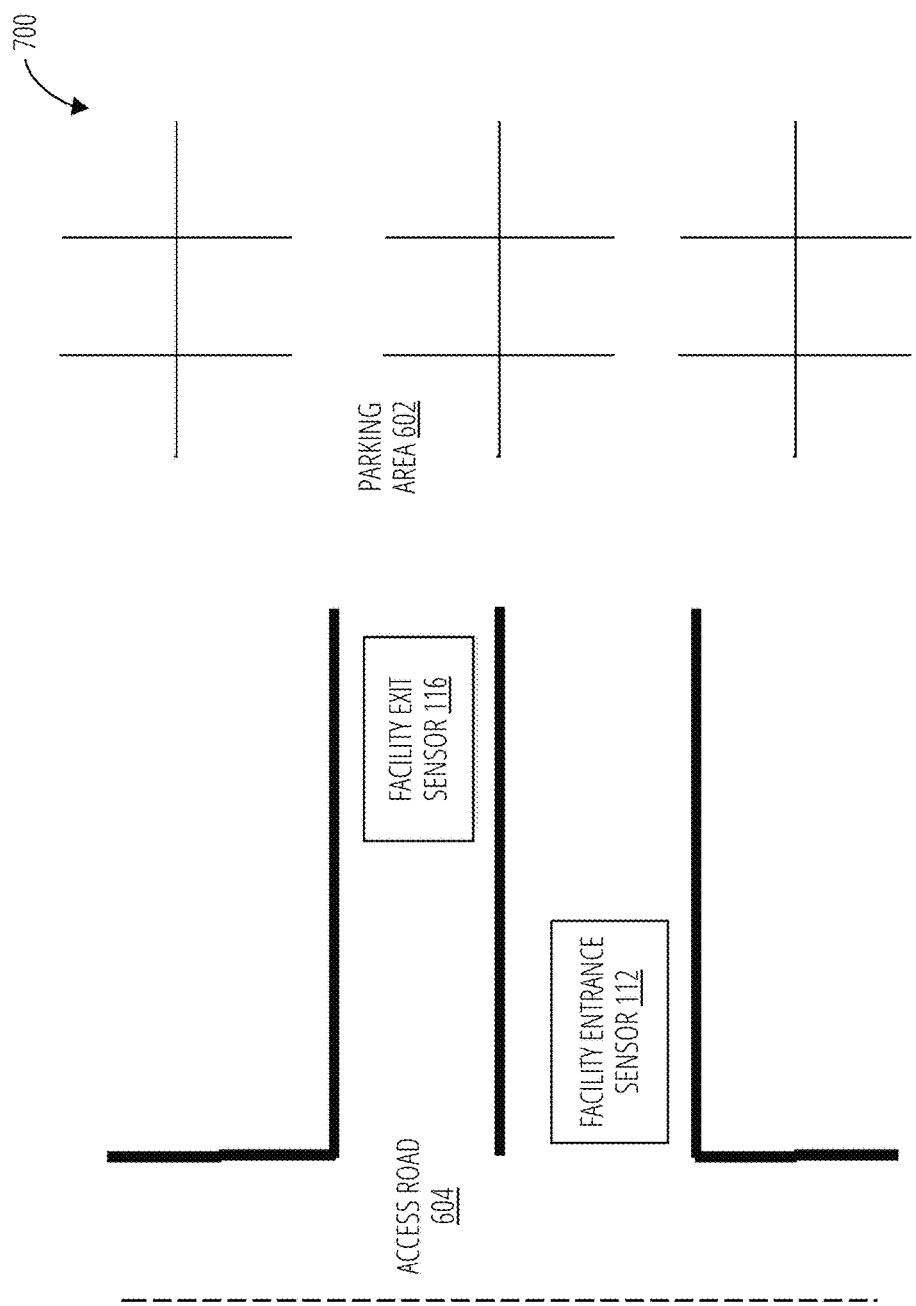
FIG. 7 illustrates an embodiment of a no-barrier parking facility 700.

Referring to FIG. 7, the no-barrier parking facility 700 comprises a facility entrance sensor 112, a facility exit sensor 116, a parking area 602, and an access road 604.

In the no-barrier parking facility 700, each access point from the parking area 602 to the access road 604 utilizes two lanes, the first lane having the facility entrance sensor 112 and the second lane having the facility exit sensor 116.

A vehicle has unobstructed access to and from the parking area 602 and the access road 604. The facility entrance sensor 112 and the facility exit sensor 116 are utilized to determine entry and exit from the no-barrier parking facility 700. Enforcement (e.g., issuing citations) rather than physical barriers are utilized to encourage compliance with payment.

When an account is created in the authentication system, a vehicle identifier such as a license plate number or other identifier such as an RF vehicle tag is associated with the driver ID. The reporting service may then provide near real time reports to enforcement personnel of authorized vehicles present in the no-barrier parking facility 700. The report of authorized vehicles could be combined with a form of automated or semi-automated vehicle detection such as Automatic Number Plate Recognition (ANPR), RF scanning, etc.

Figure 8:
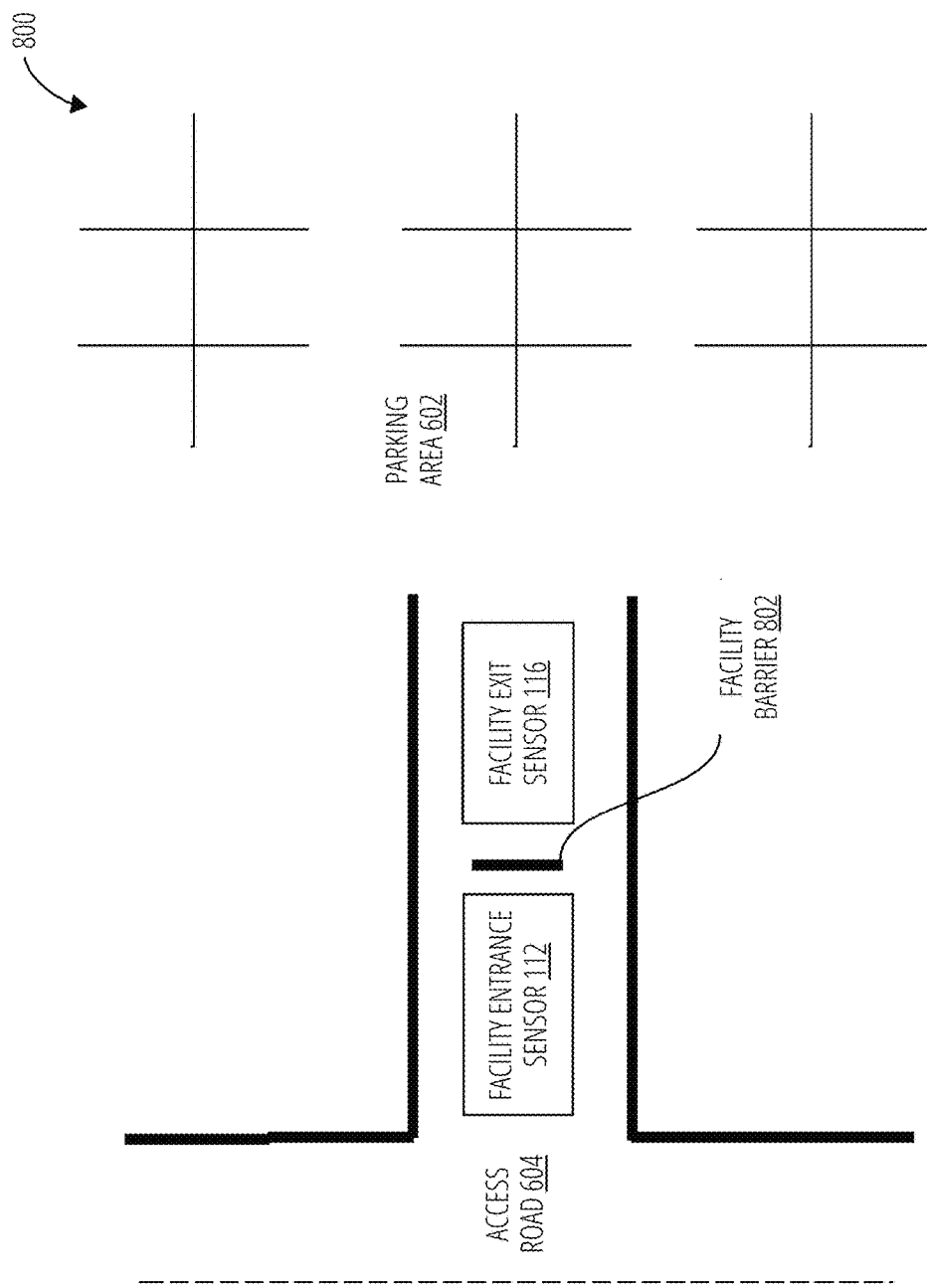
FIG. 8 illustrates an embodiment of a one-barrier parking facility 800.

Referring to FIG. 8, the one-barrier parking facility 800 comprises a facility entrance sensor 112, a facility exit sensor 116, a parking area 602, an access road 604, and a facility barrier 802.

In the one-barrier parking facility 800, each access point from the parking area 602 to the access road 604 utilizes one lane, which has the facility entrance sensor 112, the facility exit sensor 116, and the facility barrier 802, which obstruct usage of the lane.

The facility exit sensor 116 may be a simpler device, such as an off the shelf iBeacon, as only the facility barrier 802 is operated instead of multiple facility barriers. Both the entrance and exit are operated by the facility entrance sensor 112 and the entrance/exit determination via differential signal strength calculation is performed by the application rather than via a signal strength exchange.

Figure 9:
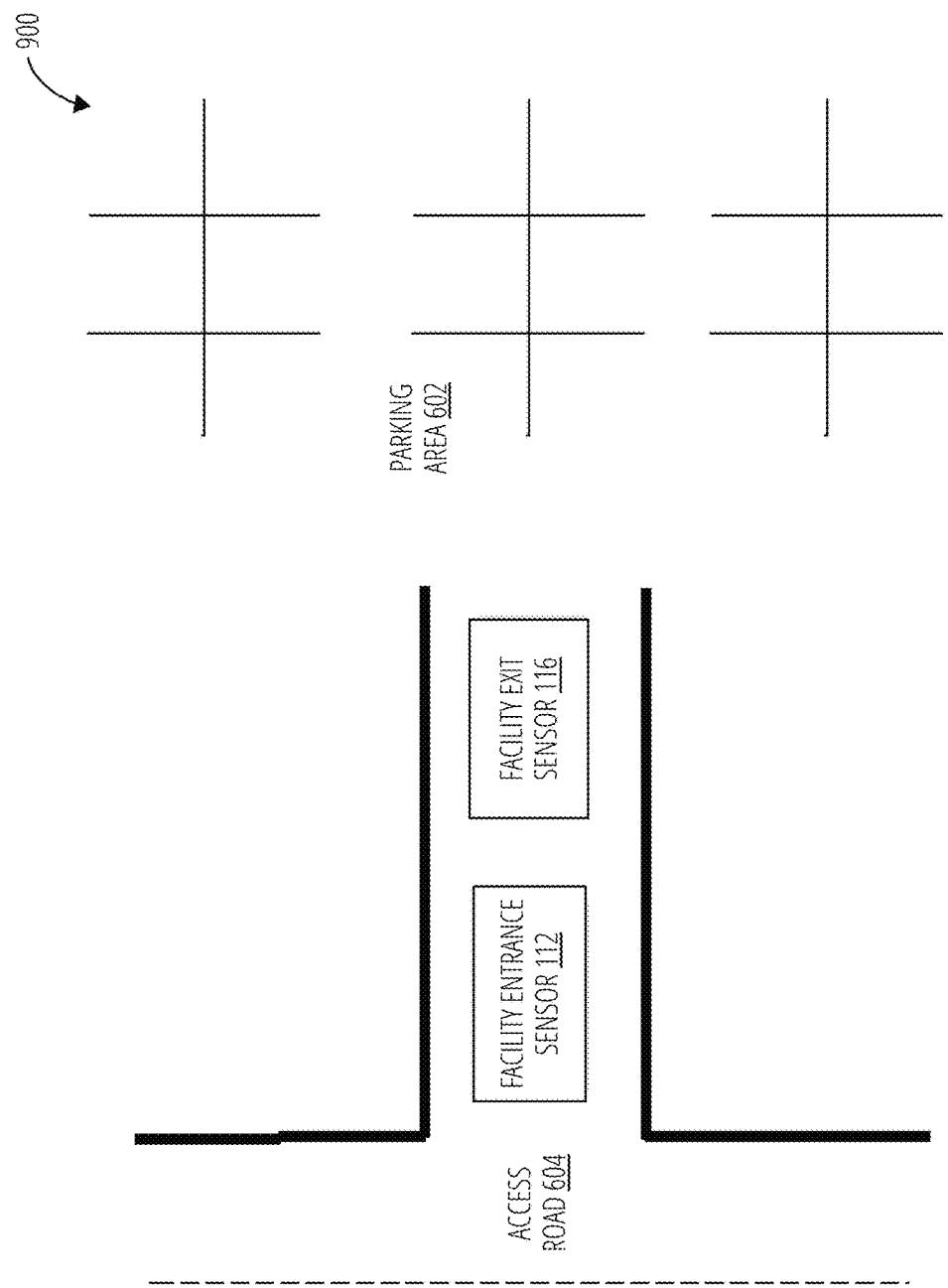
FIG. 9 illustrates an embodiment of a one-lane no-barrier parking facility 900.

Referring to FIG. 9, The one-lane no-barrier parking facility 900 comprises a facility entrance sensor 112, a facility exit sensor 116, a parking area 602, and an access road 604.

In the one-lane no-barrier parking facility 900, each access point from the parking area 602 to the access road 604 utilizes one lane, which has the facility entrance sensor 112 and the facility exit sensor 116.

In this embodiment, the parking facility has one or more access points which consist of one lane for entrance and exit which has no barrier blocking usage of the lane.

This embodiment combines the need for enforcement and vehicle identification of the second embodiment with the potentially simplified facility Exit Sensor outlined in the third embodiment.

Figure 10:
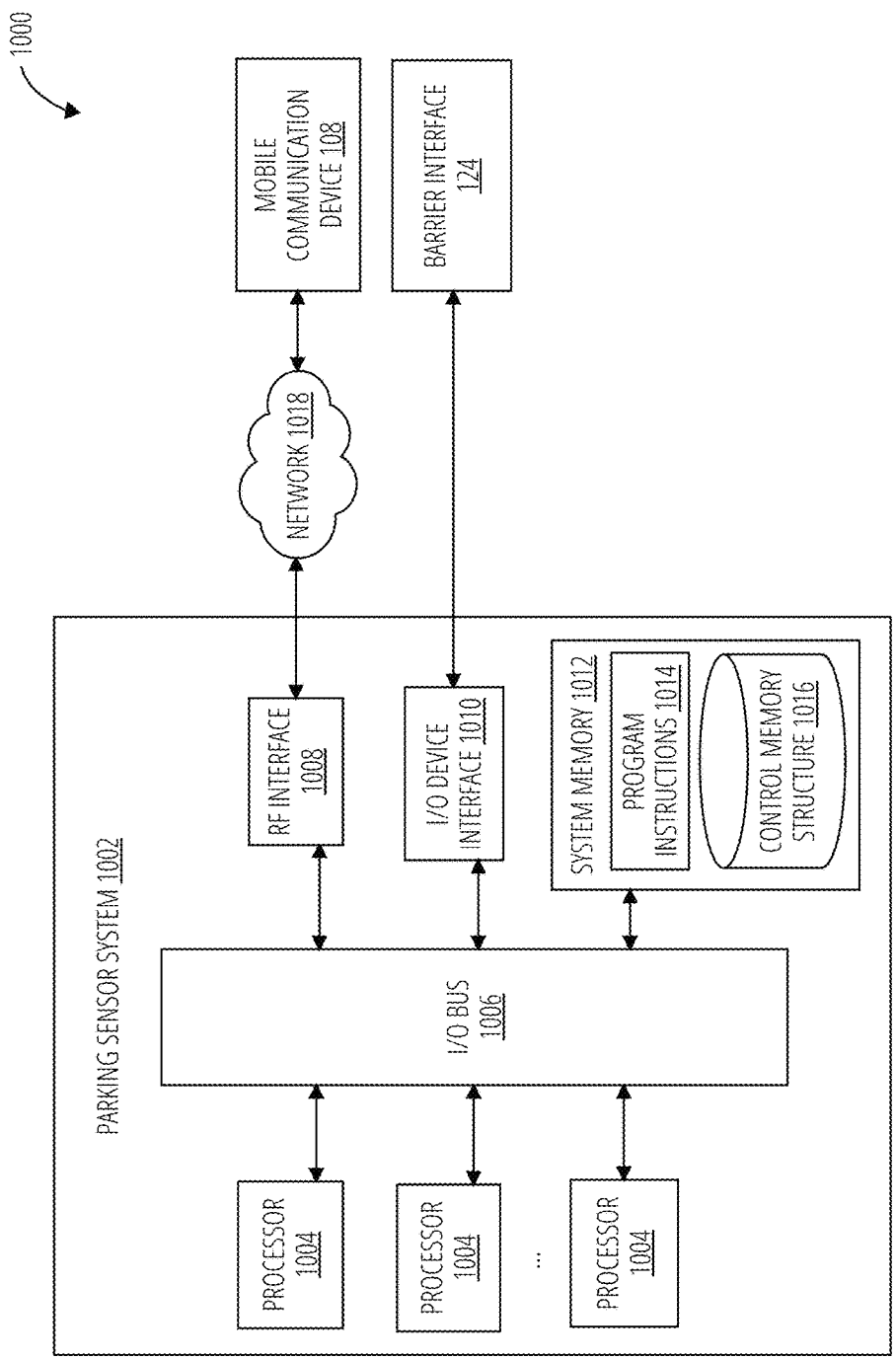
FIG. 10 illustrates an embodiment of a parking sensor system 1000.

Referring to FIG. 10, the parking sensor system 1000 comprises a mobile communication device 108, a barrier interface 124, a parking sensor system 1002, one or more processors 1004, an I/O bus 1006, an RF interface 1008, an I/O device interface 1010, a system memory 1012, a program instructions 1014, a control memory structure 1016, and a network 1018.

The parking sensor system 1002 comprises the one or more processors 1004, the I/O bus 1006, the RF interface 1008, the I/O device interface 1010, and the system memory 1012. The system memory 1012 may further comprise the program instructions 1014 and the control memory structure 1016.

The I/O bus 1006 enables communication among the one or more processors 1004, the RF interface 1008, the I/O device interface 1010, and the system memory 1012. The I/O bus 1006 provides the program instructions 1014 to the one or more processors 1004 via the I/O bus 1006. The program instructions 1014 instruct the one or more processors 1004 to operate the RF interface 1008 and the I/O device interface 1010 to communicate with the mobile communication device 108 (via the network 1018) and the barrier interface 124, respectively, and to store communications within the control memory structure 1016 of the system memory 1012.

Although the description above contains many specificities, these should not be construed as limiting the scope of the embodiments but as merely providing illustrations of some of several embodiments. For example, mobile communications devices improve rapidly; new RF communications protocols are under continuous development; location services are rapidly improving with new techniques and algorithms appearing every few years; new low power micro-controllers and computing platforms emerge rapidly; and new variations on cellular and other mobile communications protocols are under development.

Thus, the scope of the embodiments should be determined by the appended claims and their legal equivalents, rather than by the examples given.

Figure 11:
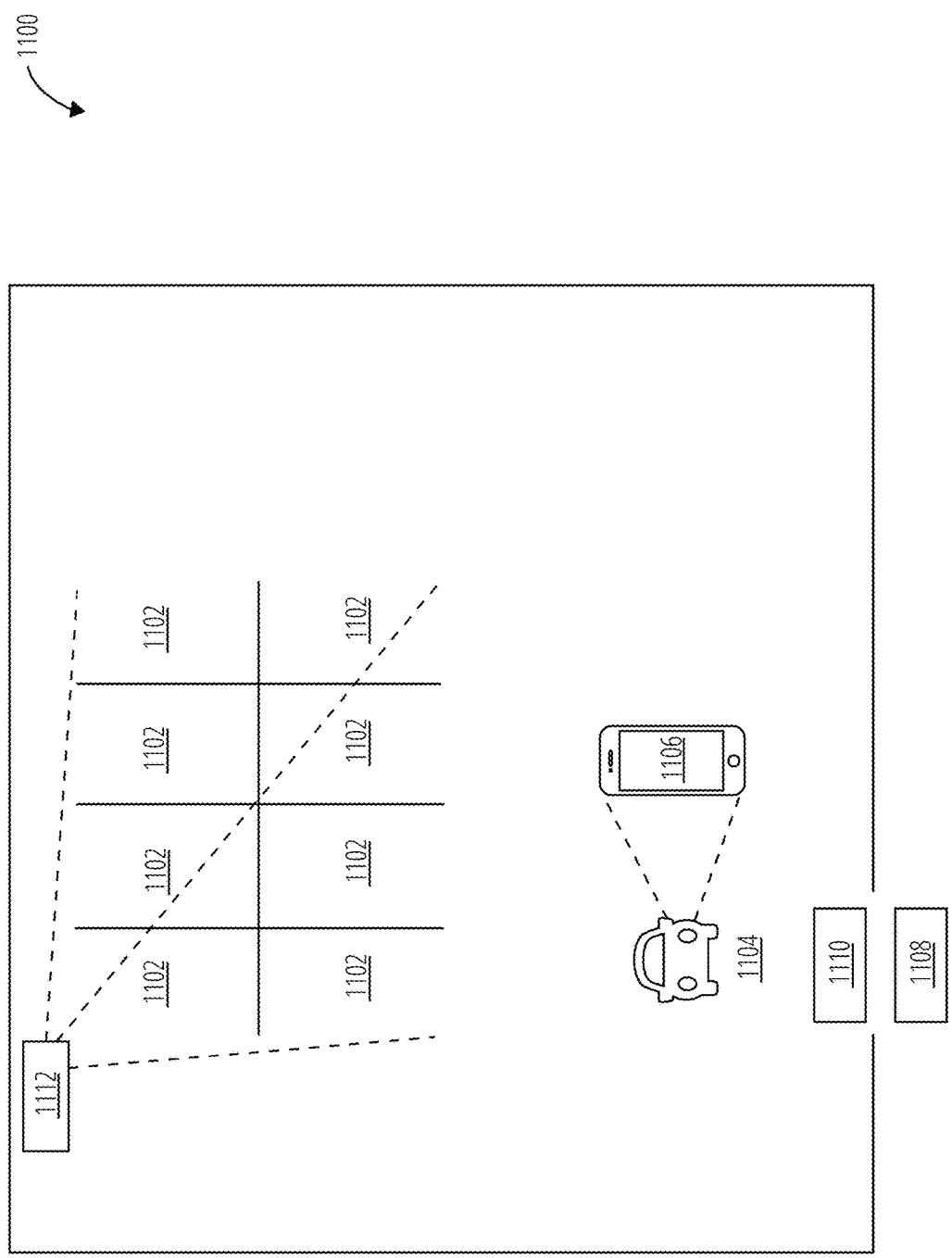
FIG. 11 illustrates an embodiment of a parking area system 1100.

Referring to FIG. 11, the parking area system 1100 comprises one or more parking spots 1102, a vehicle 1104, a mobile communication device 1106, a facility entrance sensor 1108, a facility exit sensor 1110, and a one or more parking sensors 1112.

The one or more parking spots 1102 may be allocated utilizing an application operated by the mobile communication device 1106. Each of the one or more parking spots 1102 may be occupied or unoccupied by a vehicle 1104.

The mobile communication device 1106 may be embedded within the vehicle 1104, such as a self-driving vehicle, or may be a separate device, such as a smartphone. The mobile communication device 1106 communicates with the facility entrance sensor 1108, the facility exit sensor 1110, and the one or more parking sensors 1112 to determine authorization for ingress and egress from a facility and to determine which of the one or more parking spots 1102 to park the vehicle 1104. Authorization to park in one of the one or more parking spots 1102 may be determined by authorizations stored on the mobile communication device 1106 and/or by the availability of the one or more parking spots 1102 determined by the facility entrance sensor 1108, the facility exit sensor 1110, and the one or more parking sensors 1112. Authorization may be associated with a datetime stamp. The mobile communication device 1106 may determine which of the available, authorized parking spot of the one or more parking spots 1102 based on factors such as current distance from the parking spot, distance of the parking spot from one or more features of the parking facility, pre-determined preferences stored in an application on the mobile communication device 1106, and by manually entered preferences entered into the mobile communication device 1106. The mobile communication device 1106 may communicate the selection with the facility entrance sensor 1108 and the facility exit sensor 1110. The mobile communication device 1106 may also store a navigation layout to enable the vehicle 1104 to park in the selected parking spot without driver assistance. The navigation layout may be received by the mobile communication device 1106 from an authorization service, the facility entrance sensor 1108, and/or the facility exit sensor 1110.

The facility entrance sensor 1108 and the facility exit sensor 1110 authorize entrance and exit from the facility. The facility entrance sensor 1108 or the facility exit sensor 1110 may communicate to the mobile communication device 1106 information concerning the availability of the one or more parking spots 1102 and may receive and store selection communicated from the mobile communication device 1106 to determine the occupancy of each of the one or more parking spots 1102.

The one or more parking sensors 1112 determine whether each of the one or more parking spots 1102 are available or occupied. The one or more parking spots 1102 may communicate with the mobile communication device 1106, which may store the availability of each of the one or more parking spots 1102 to send to the facility entrance sensor 1108 and/or the facility exit sensor 1110. The one or more parking sensors 1112 may also communicate with the vehicle 1104, utilizing communication device such as radio-frequency identification (RFID) tags.

Figure 12:
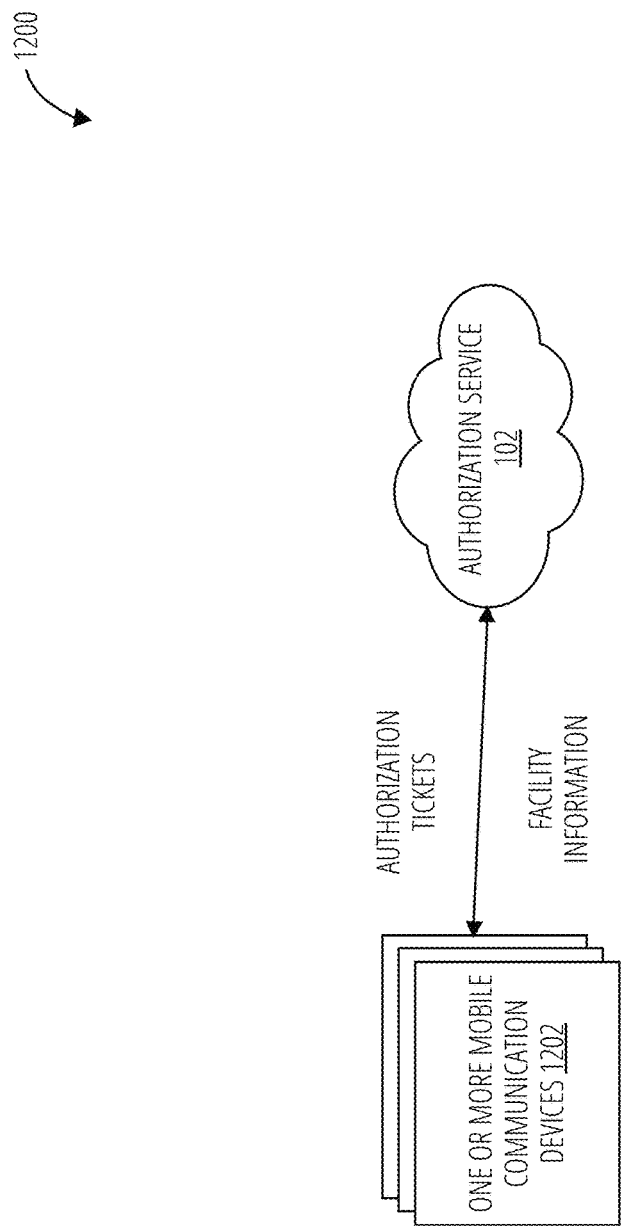
FIG. 12 illustrates an embodiment of an authorization system 1200.

Referring to FIG. 12, the authorization system 1200 comprises an authorization service 102 and one or more mobile communication devices 1202.

The authorization service 102 may receive facility information from the one or more mobile communication devices 1202 via a network. Facility information may include logs from other mobile communication devices and occupancy information. The authorization service 102 generates authorization tickets for the one or more mobile communication devices 1202. The authorization tickets may be determined by time, location, payment information, current occupancy of one or more facilities, etc. The authorization service 102 then send the authorization tickets to the one or more mobile communication devices 1202 via the network. The authorization service 102 may associate one or more parking facilities as a parking pool. The parking pool may be further associated with the one or more mobile communication devices 1202. Each of the one or more mobile communication devices 1202 receiving an authorization ticket for the parking pool.

The one or more mobile communication devices 1202 gather facility information from each facility via message exchanges with facility entrance and exit sensors. The one or more mobile communication devices 1202 send the facility information to the authorization service 102 via the network. The one or more mobile communication devices 1202 receives and stores the authorization ticket(s).

Figure 13:
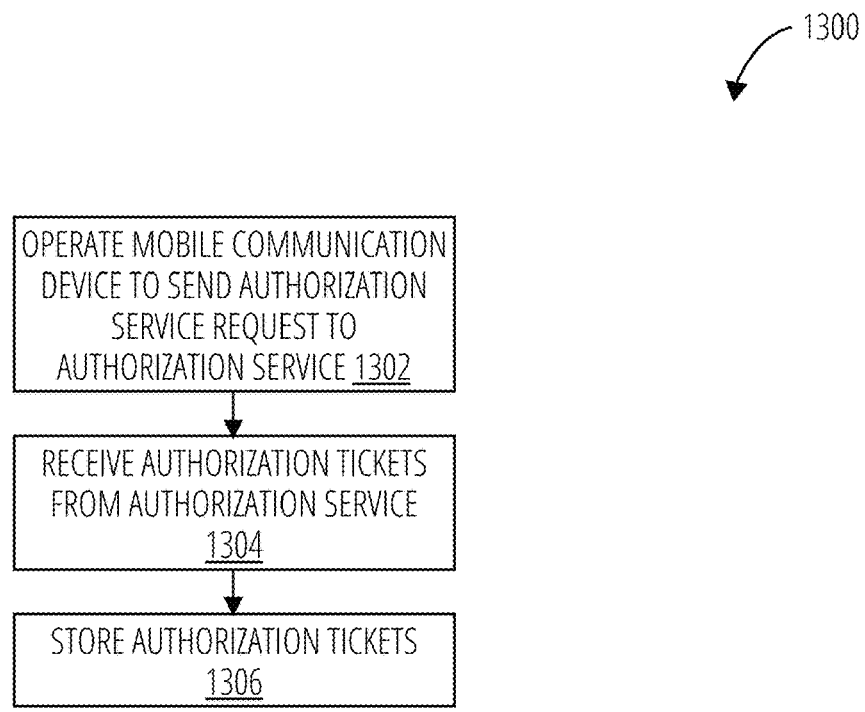
FIG. 13 illustrates an embodiment of an authorization method 1300.

Referring to FIG. 13, the authorization method 1300 operates a mobile communication device to send an authorization service request to an authorization service (block 1302). The authorization service request may include driver ID, device location information, and instruction for the authorization service to send authorization tickets associated with the provided information. Messages may be utilized to communicate over a network. Authorization tickets are received from the authorization service (block 1304). Messages may be utilized to communicate over a network. The authorization tickets are stored (block 1306). The authorization tickets may be stored on the mobile communication device or may be stored by a local authorization cache.

In some embodiments, proximity to a parking facility may be detected. In response to detecting the proximity to the parking facility, the authorization method 1300 may be initiated. In further embodiments, the authorization service request may comprise instruction to send an authorization ticket associated with the parking facility in which proximity is detected. Other embodiments may request authorization tickets based on distance from the provided location.

Figure 14:
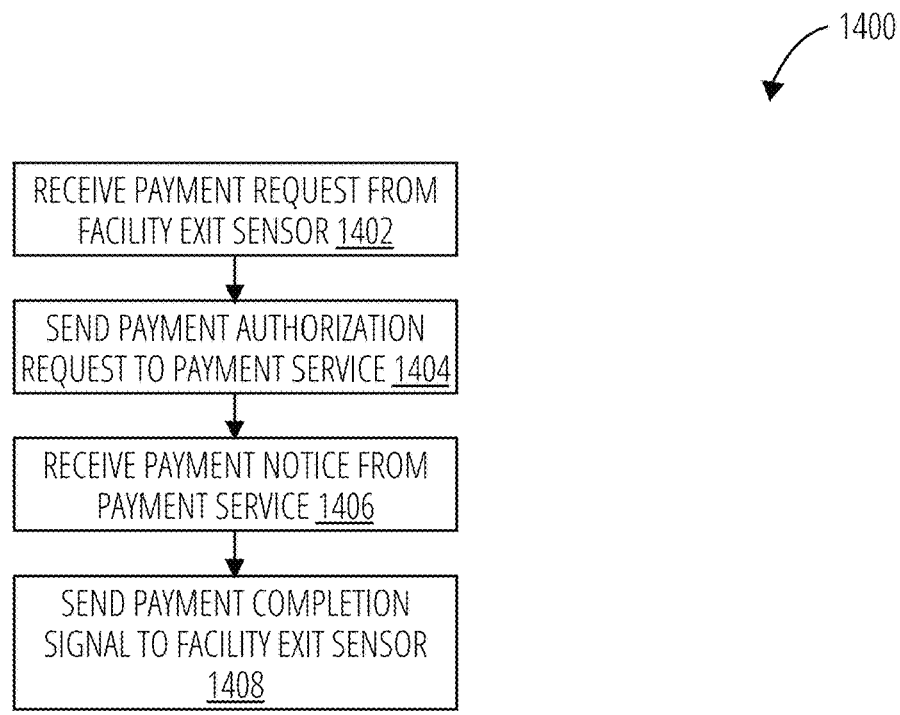
FIG. 14 illustrates an embodiment of a payment method 1400.

Referring to FIG. 14, the payment method 1400 comprises receiving a payment request from a facility exit sensor (block 1402). Messages may be utilized for the payment request. A payment authorization request is sent to the payment service (block 1404). Messages may be utilized for the payment authorization request. The payment authorization request may comprise payment amount, account information (such as driver ID to identify the account), and instructions to authorize, perform, and send a notification of performance to the mobile communication device. The payment authorization request may comprise instructions for the mobile communication device to perform the sending of the payment authorization request to the payment service. A payment notice is received (block 1406). Messages may be utilized for the payment notice. A payment completion signal is sent to the facility exit sensor (block 1408). Messages may be utilized for the payment completion signal.

Figure 15:
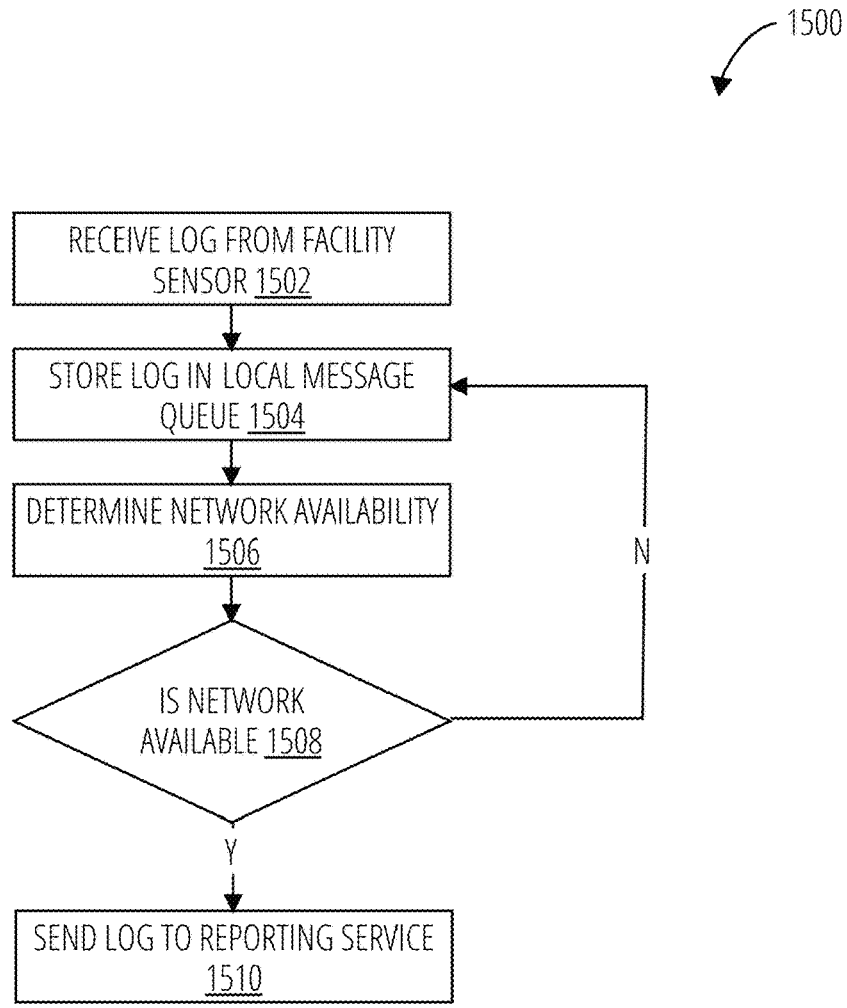
FIG. 15 illustrates an embodiment of a reporting (lazy delivery) method 1500.

Referring to FIG. 15, the reporting (lazy delivery) method 1500 comprises a receiving a log from a facility sensor (block 1502). The log is stored in a local message queue (block 1504). The log may be stored with one or more other logs. Logs may include calculated trajectories from the facility entrance sensor and the facility exit sensor for post-transaction security auditing, the driver ID, the ticket ID, the datetime value, payment information, facility occupancy information, etc. Network availability is determined (block 1506). Network availability may be check intermittently by a mobile communication device or the mobile communication device may be instructed to maintain a passive reception state for network availability, notifying the reporting (lazy delivery) method 1500 when detected. Network availability includes Internet connectivity. Whether a network is available is determined (decision block 1508). If so, the log is sent to a reporting service (block 1510). The log may be sent to the reporting service with one or more other logs. These logs may be stored in a reporting service message queue for further processing. If not, the log is continued to be stored.

Figure 16:
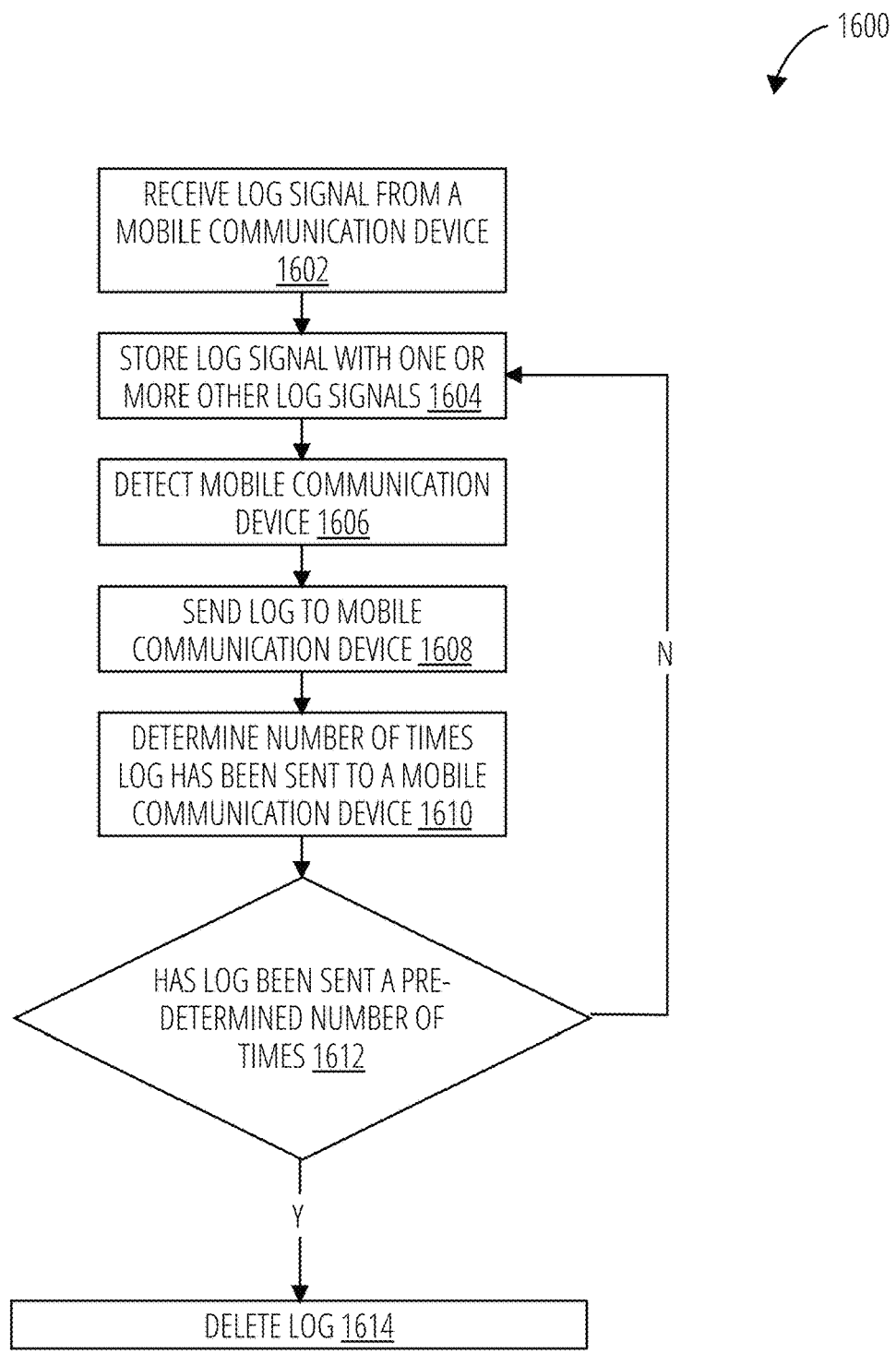
FIG. 16 illustrates an embodiment of a sensor logging method 1600.

Referring to FIG. 16, the sensor logging method 1600 comprises receiving a log signal from a mobile communication device (block 1602). The log signal may include requests for entry or exit and may comprise information such as driver ID, facility ID, datetime value, etc. The log signal is stored with one or more other log signals (block 1604). The log signal may be stored in a local control memory structure. Each log may also be associated with a number of times sent. A mobile communication device is detected (block 1606). Detection of a mobile communication device may occur due to the mobile communication device sending a signal that is received, such as an RF signal. The log is sent to the mobile communication device (block 1608). The log may be sent with one or more other logs stored. A counter may be incremented to update the number of times the log has been sent. The number of times a log has been sent to a mobile communication device is determine (block 1610). A counter may be queried to determine the number of time the log has been sent. Whether a log has been sent a pre-determined number of times is determined (decision block 1612). The pre-determined number of times may be stored in a local control memory structure and may be updated by messages from a mobile communication device or by signal from other devices. If the log has been sent a pre-determined number of times, the log is deleted (block 1614). If not, the log is continued to be stored.

In other embodiment, the sensor logging method 1600 may determine whether to send a log to the mobile communication device. The determination may be based on whether the mobile communication device has previously received the log, time elapsed since the log has been previously sent, a random variable, the number of unique mobile communication devices to which the log has been sent, etc.

Figure 17:
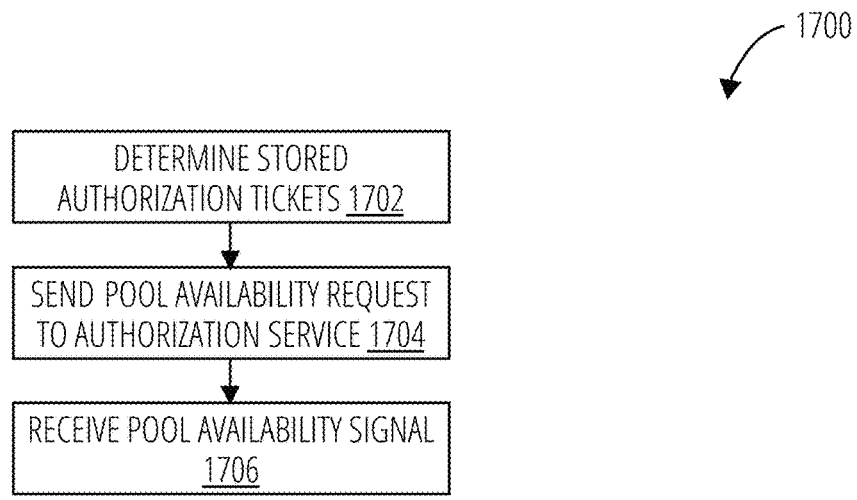
FIG. 17 illustrates an embodiment of a facility pooling method 1700.

Referring to FIG. 17, the facility pooling method 1700 comprises a determining stored authorization tickets (block 1702). A pool availability request is sent to an authorization service (block 1704). The pool availability request may comprise instruction for the authorization service to determine the occupancy of a parking pool and send a pool availability signal. The pool availability signal may include a list of the available spaces in the parking facilities associated with the parking pool. The pool availability signal is received (block 1706).

In some embodiments, the facility pooling method 1700 may send a request to update the stored authorization tickets. The facility pooling method 1700 may also determine an available space of the available spaces in the parking pool to associate with a mobile communication device. The selection may result from a user input from a machine interface, may be determined by an application operating on the mobile device, or may be determine by the authorization service and included with the pool availability signal. The pool availability signal may further alter the state of the mobile communication device/application, such as displaying the location of the available space on the machine interface, providing routing information to the available space, instructing the mobile communication device to navigate to the available space, etc.

The facility pooling method 1700 may also create a reservation. The pool availability request may be generated based on other applications associated with the mobile communication device, such as the calendar, location, and commute time. After determining a parking space, a reservation signal is sent to the authorization service which updates the availability of the parking space.

Figure 18:
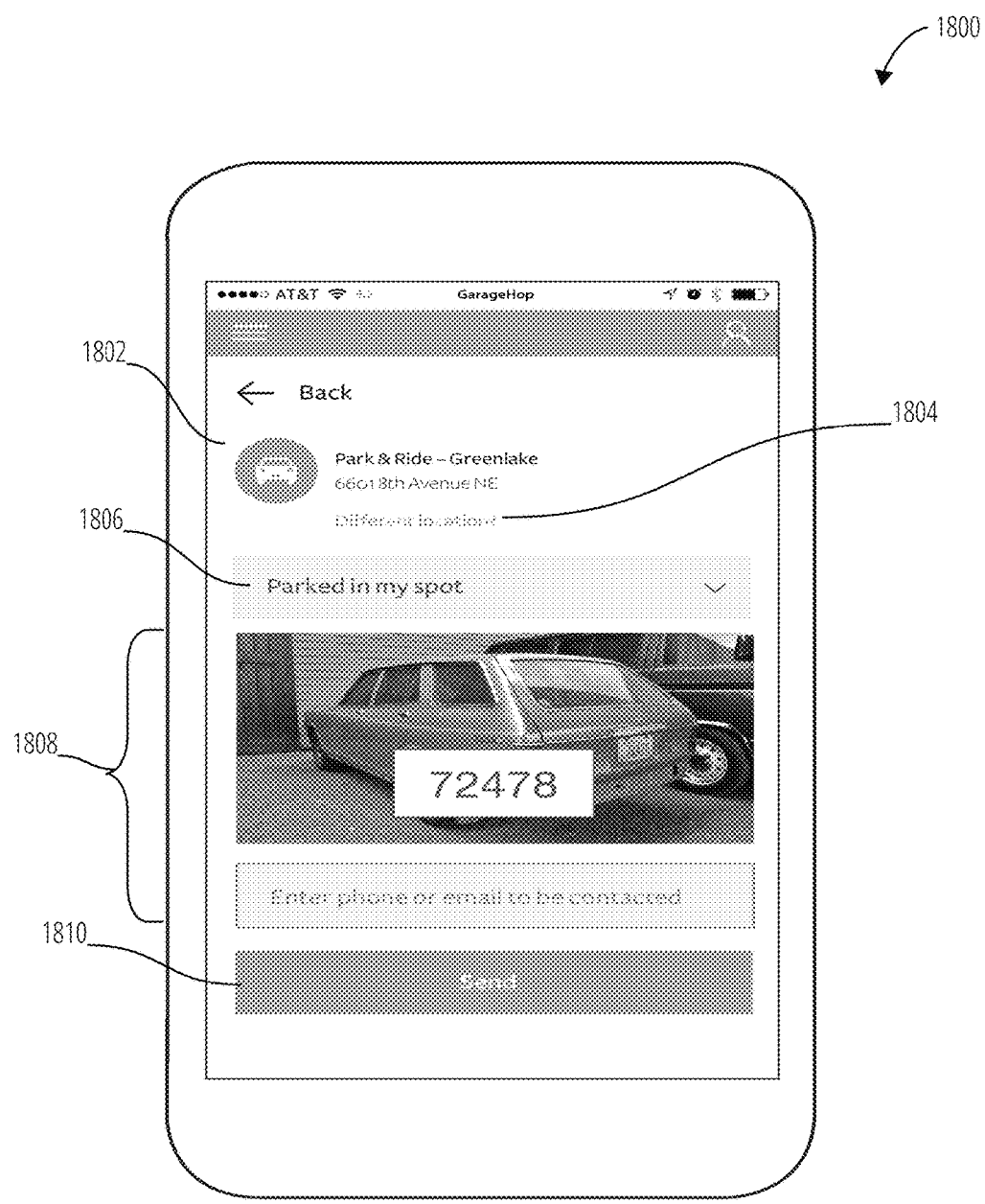
FIG. 18 illustrates an embodiment of a mobile communication device machine display 1800.
Figure 19:
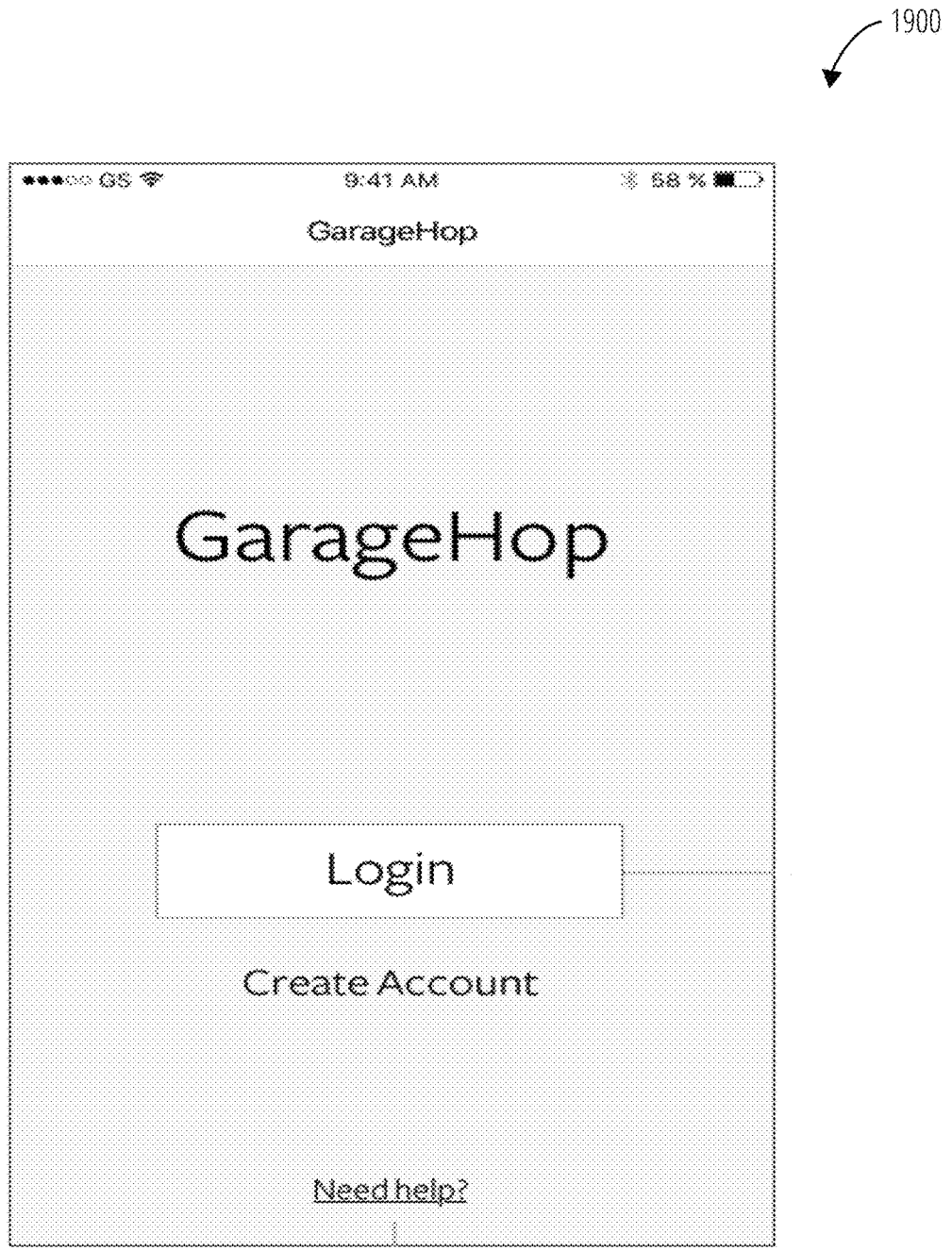
FIG. 19 illustrates an embodiment of a mobile communication device machine display 1900.
Figure 20:
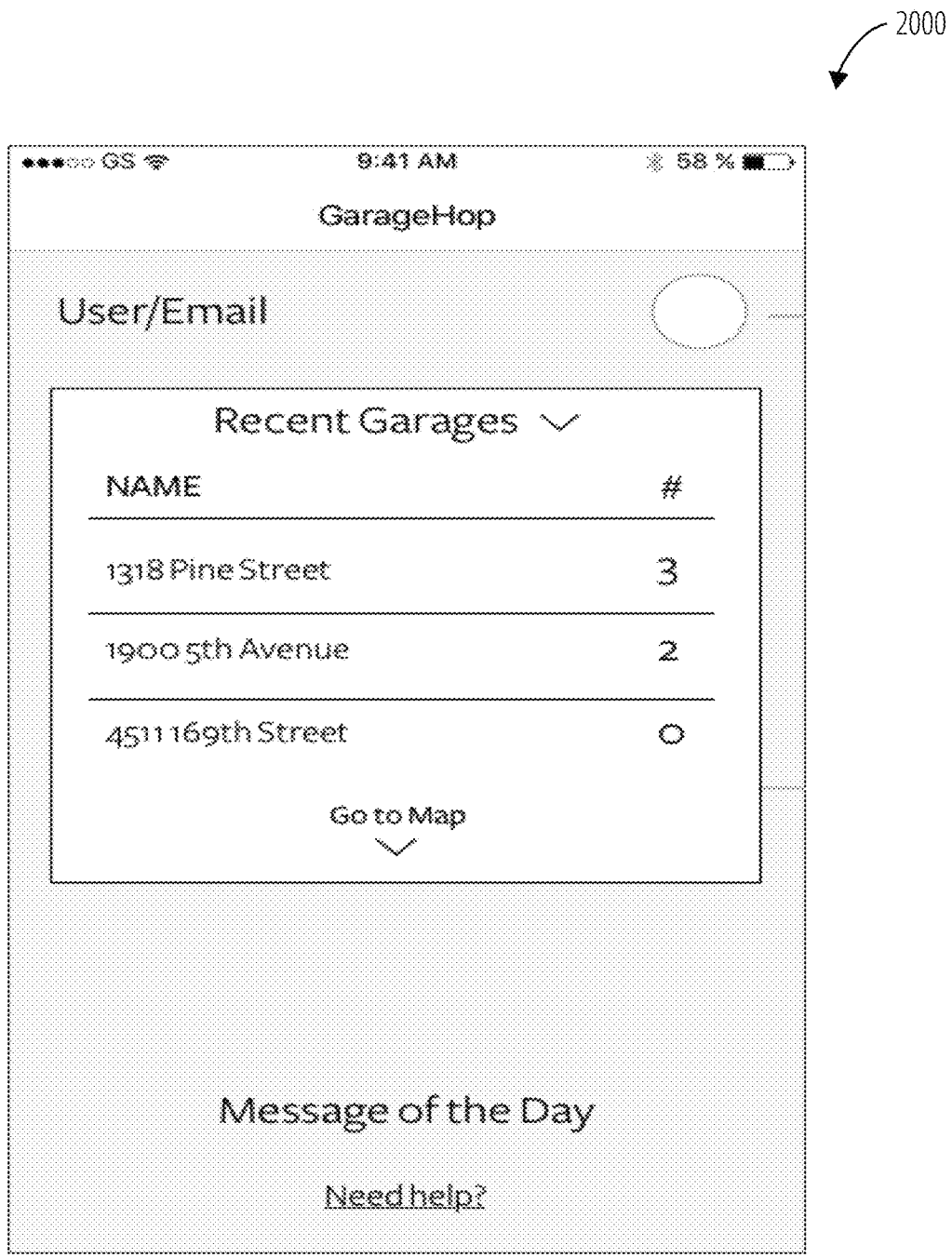
FIG. 20 illustrates an embodiment of a mobile communication device machine display 2000.

Referring to FIG. 18, the mobile communication device machine display 1800 comprises a parking pool indicator 1802, a parking pool selector 1804, a violation selector 1806, an information input activators 1808, and a violation log activator 1810.

The parking pool indicator 1802 may display information regarding the selected reservation including parking pool name, location, parking space, etc.

The parking pool selector 1804 may receive an input signal to alter the machine display of the mobile communication device. The resulting machine display may receive further inputs to select a parking pool.

The violation selector 1806 may receive an input signal to alter the machine display of the mobile communication device. The mobile communication device may be altered to display a list of violations, each configured to receive an input.

The information input activators 1808 may receive an input to alter the mobile communication device. The information input activators 1808 may alter the mobile communication device to operate an image receiving and processing application, a text entry application, a audio receiving and processing application, etc. The image processor may determine specific features of the image, such as the license plate of a vehicle. The information input activators 1808 may depend of the violation selector 1806.

The violation log activator 1810 may alter the mobile communication device to send a message to the reporting service. The mobile communication device may utilize lazy reporting. In some embodiments, the message is automatically geo-tagged and time-stamped. Information in the message may be utilized to determine an associated account, such as a driver ID associated with a vehicle. The account may have authorization tickets altered (e.g., suspended, inactivated, deleted) as a result.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Figure 21:
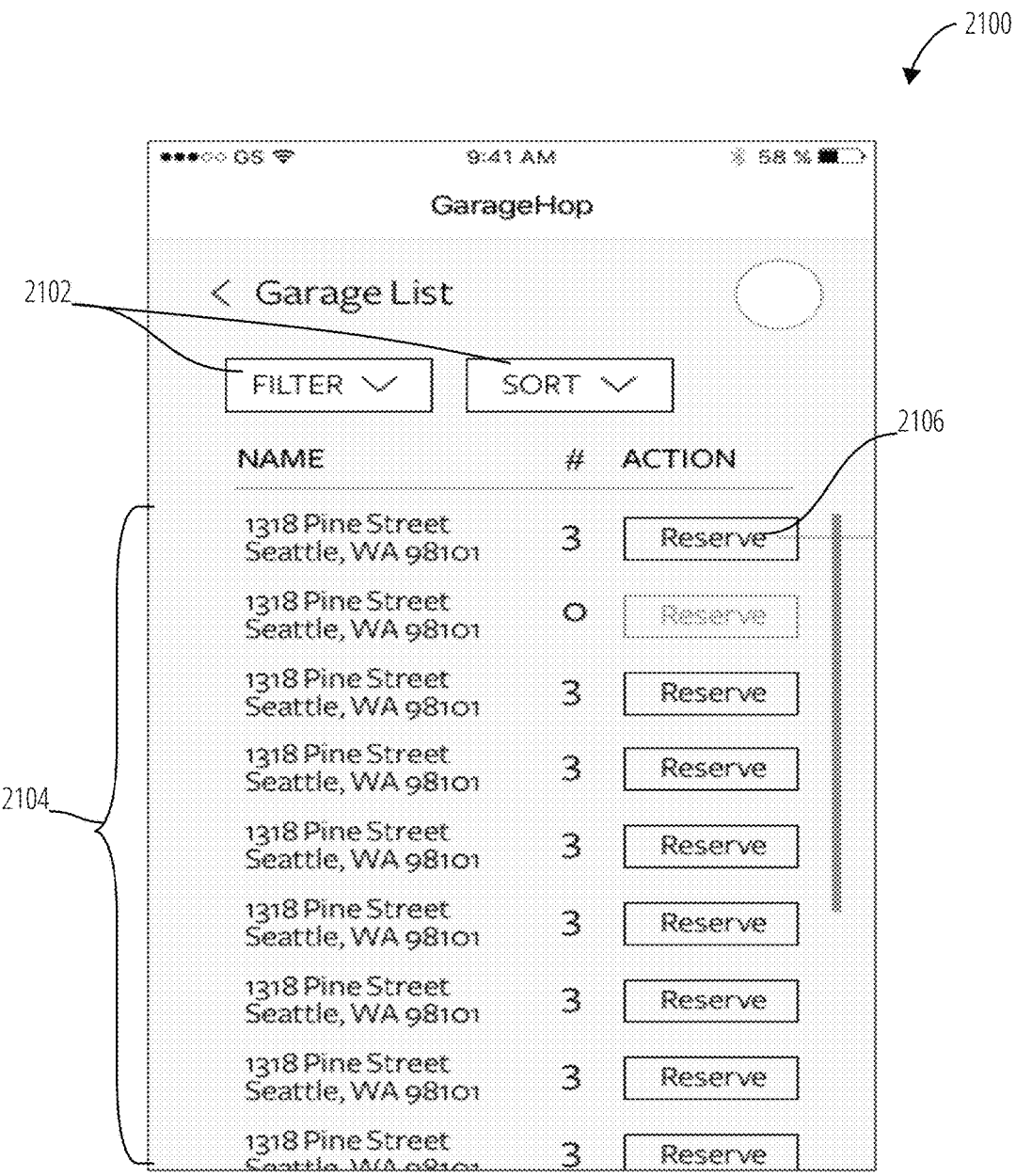
FIG. 21 illustrates an embodiment of a mobile communication device machine display 2100.

Referring to FIG. 21, the mobile communication device machine display 2100 comprises parking pool display selectors 2102, one or more parking pools 2104, and a reservation activator 2106.

The parking pool display selectors 2102 may alter the arrangement of the one or more parking pools 2104 on the mobile communication device machine display 2100.

The one or more parking pools 2104 comprise a list of the available parking pools. As depicted in mobile communication device machine display 2100, the one or more parking pools 2104 are listed based on location to the mobile communication device. Each display comprises further information, such as parking spot available, address, ID, distance, etc. Each of the one or more parking pools 2104 may represent one parking facility or may represent multiple facilities comprised by the parking pool.

The reservation activator 2106 may receive an input from the mobile communication device to send a reservation request to an authorization service. The reservation request may alter the authorization service to determine a parking spot and associated the parking spot with the mobile communication device. The reservation request may further instruct the authorization service to send an authorization ticket to the mobile communication device to be stored.

Figure 22:
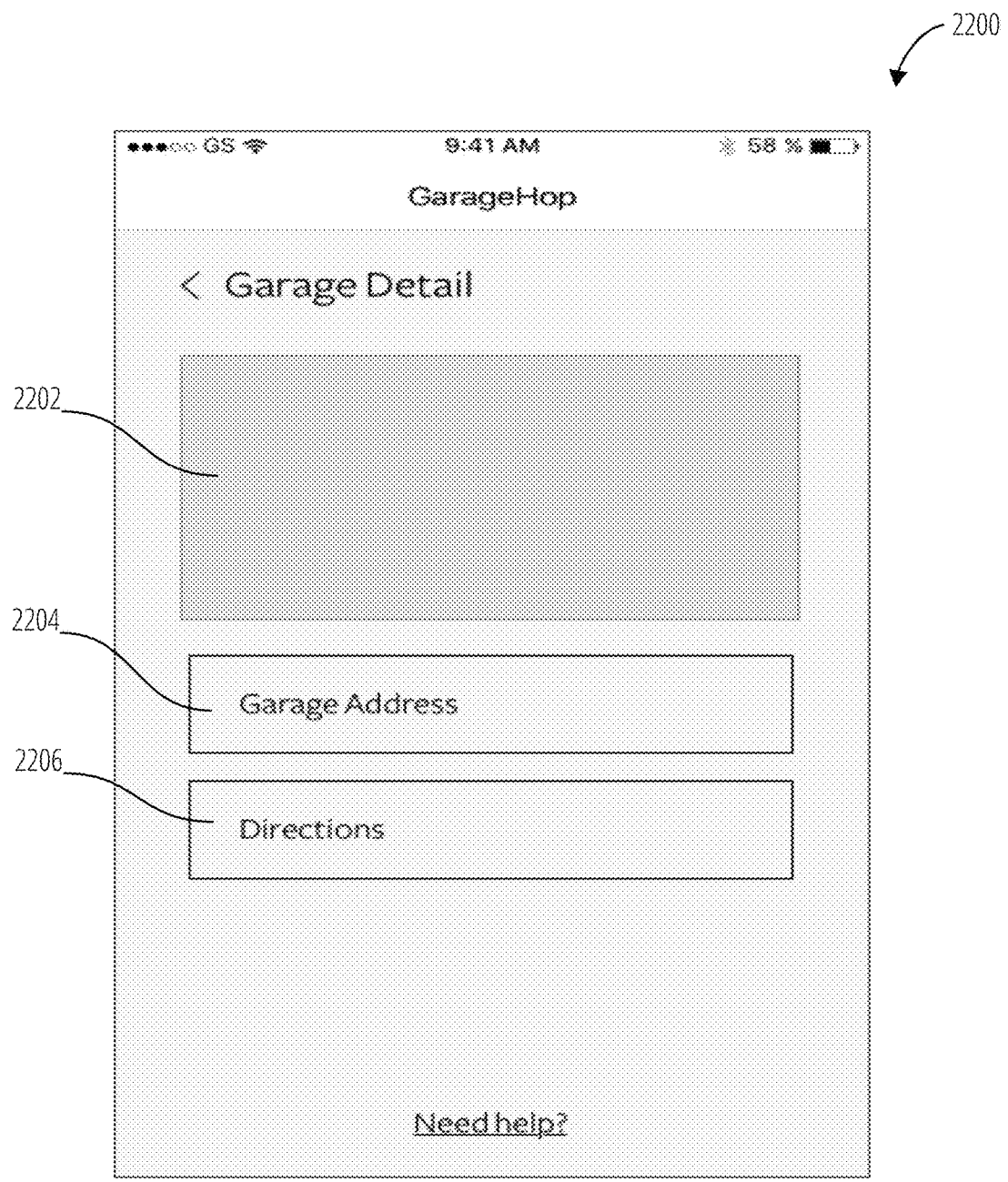
FIG. 22 illustrates an embodiment of a mobile communication device machine display 2200.

Referring to FIG. 22, the mobile communication device machine display 2200 comprises a location display 2202, a parking pool display 2204, and an information activator 2206.

The location display 2202 may display the location of the parking pool and the location of the mobile communication device.

The parking pool display 2204 displays information such as parking spot available, address, ID, distance, etc.

The information activator 2206 may receive an input from the mobile communication device to alter the mobile communication device to display further information, such as map and navigation instructions.

Figure 23:
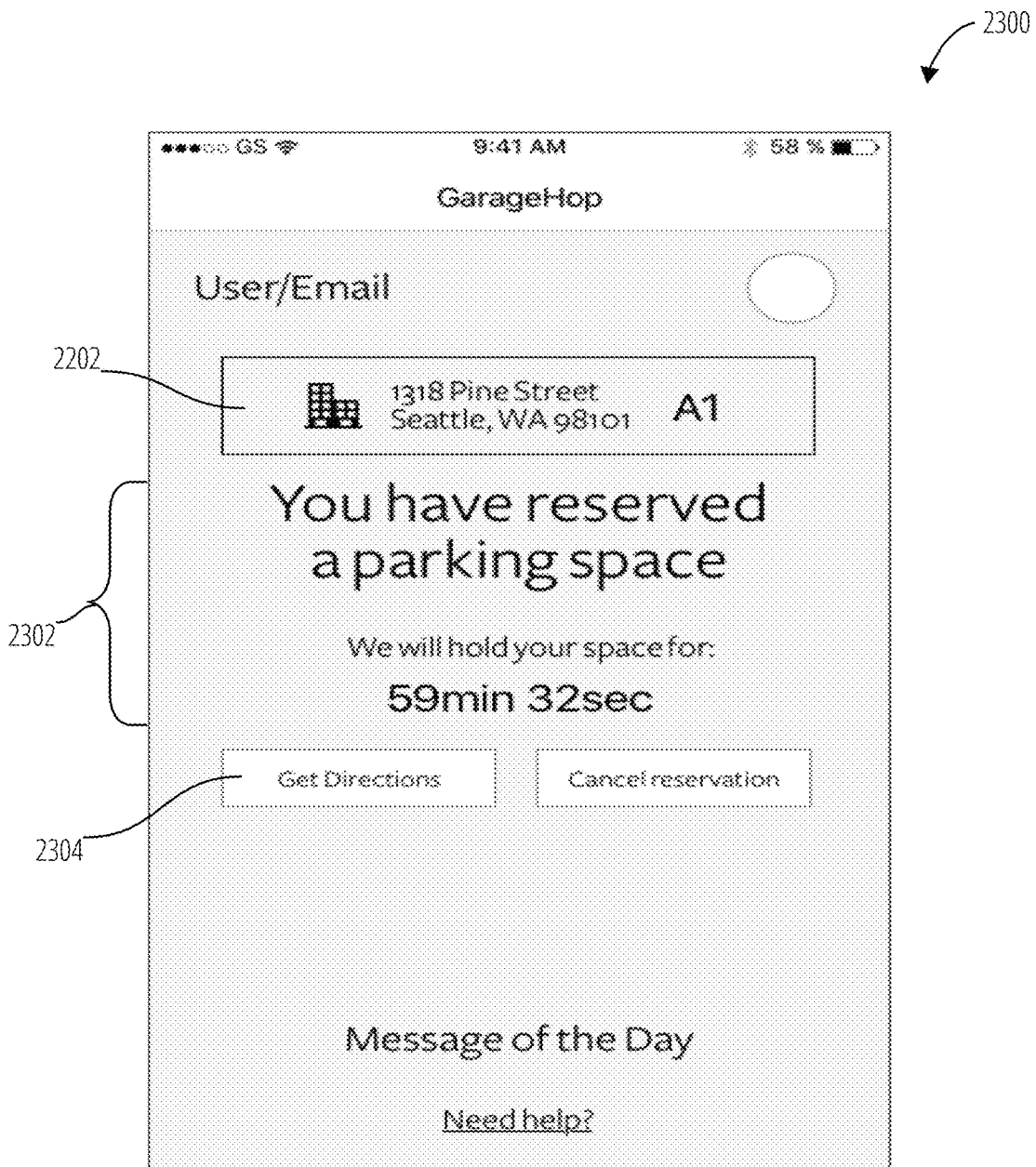
FIG. 23 illustrates an embodiment of a mobile communication device machine display 2300.
Figure 24:
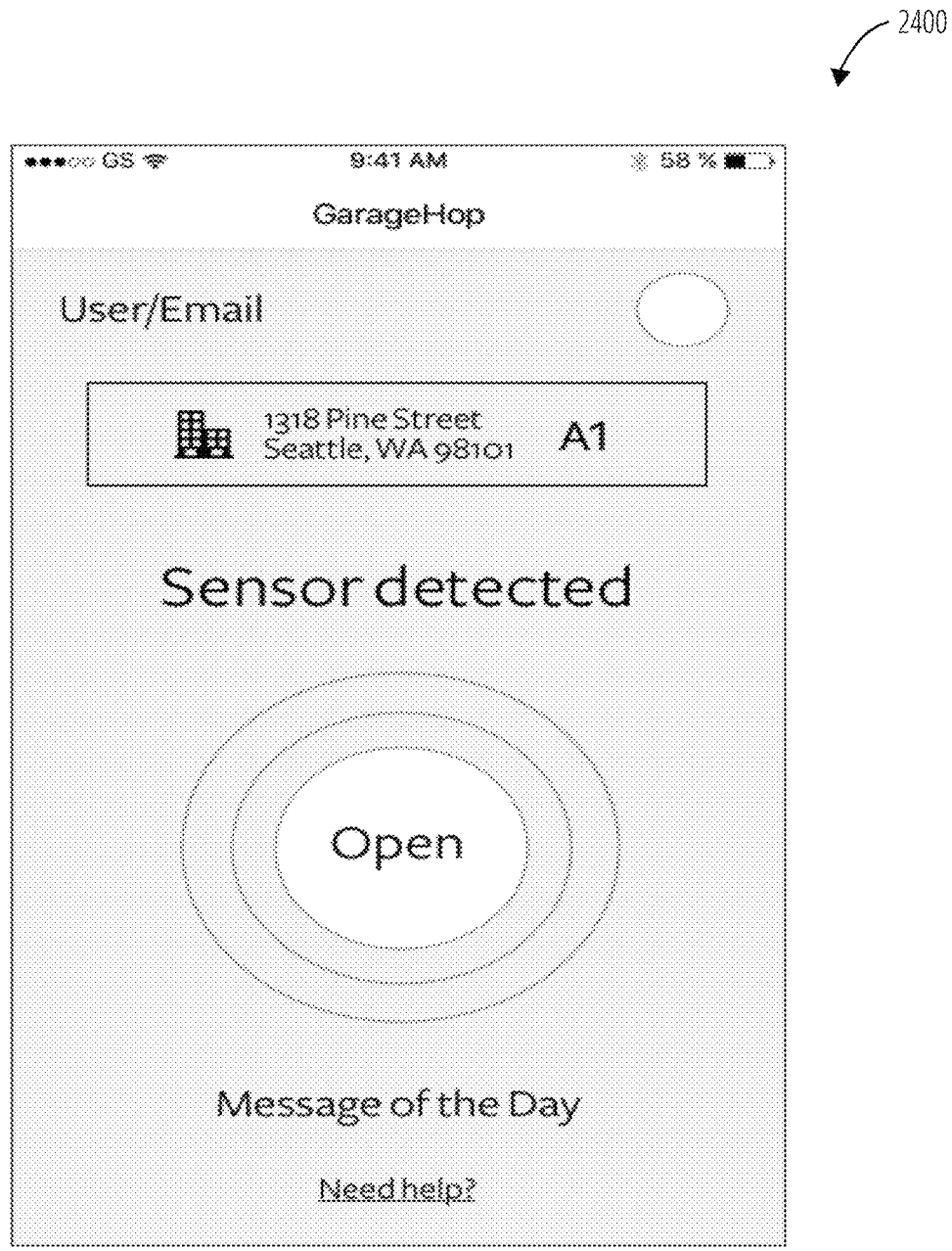
FIG. 24 illustrates an embodiment of a mobile communication device machine display 2400.
Figure 25:
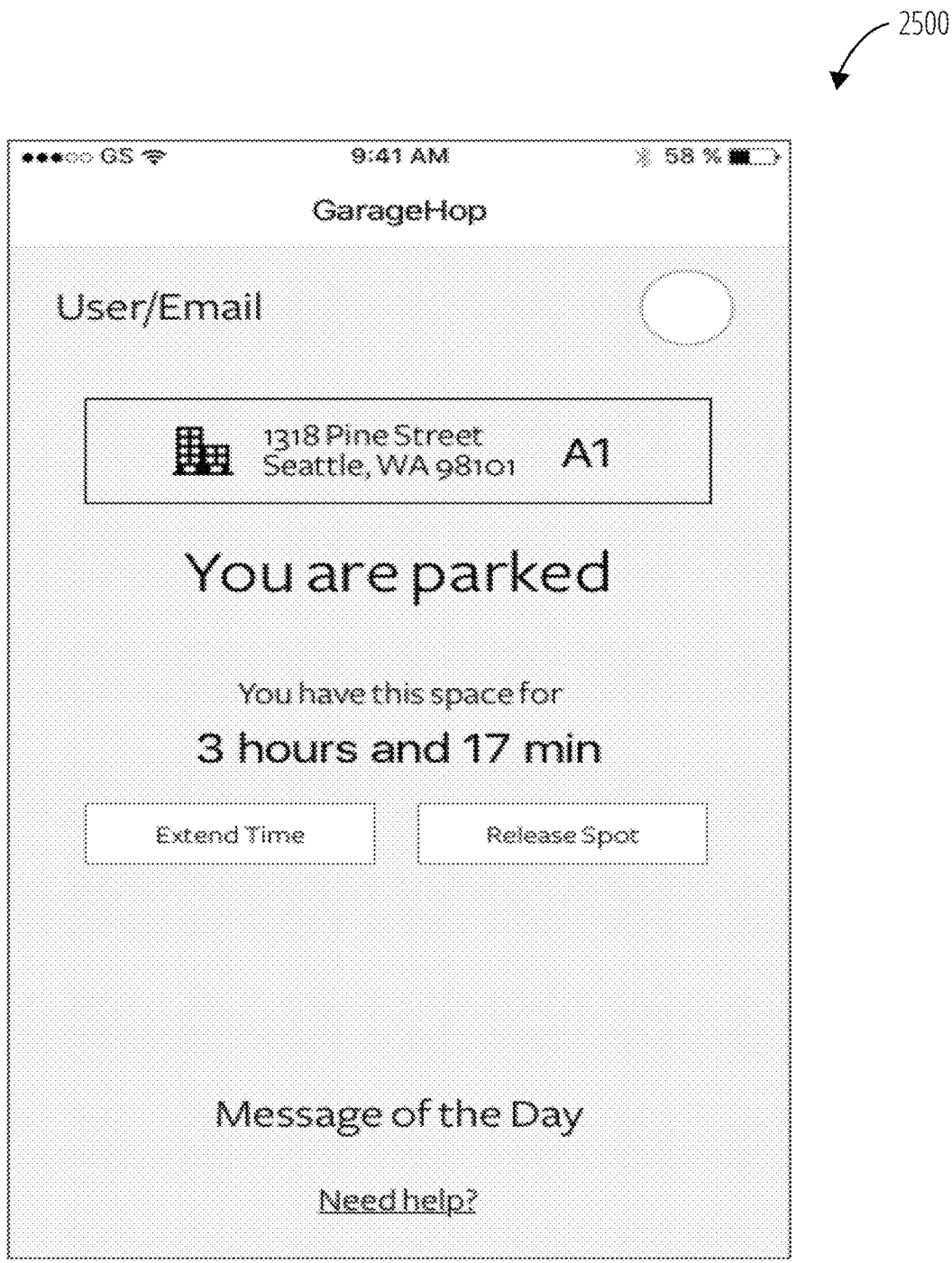
FIG. 25 illustrates an embodiment mobile communication device machine display 2500.
Figure 26:
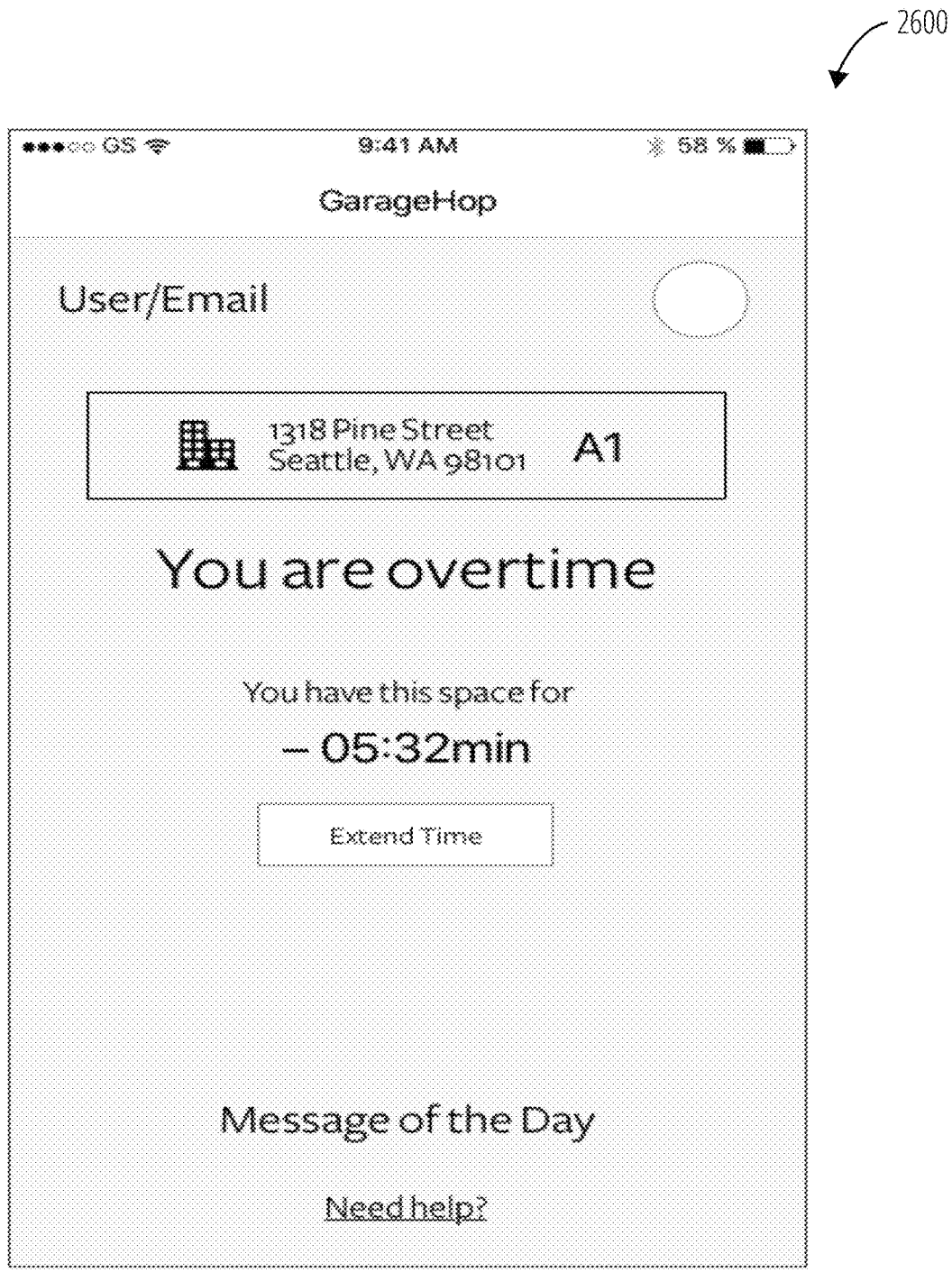
FIG. 26 illustrates an embodiment of a mobile communication device machine display 2600.
Figure 27:
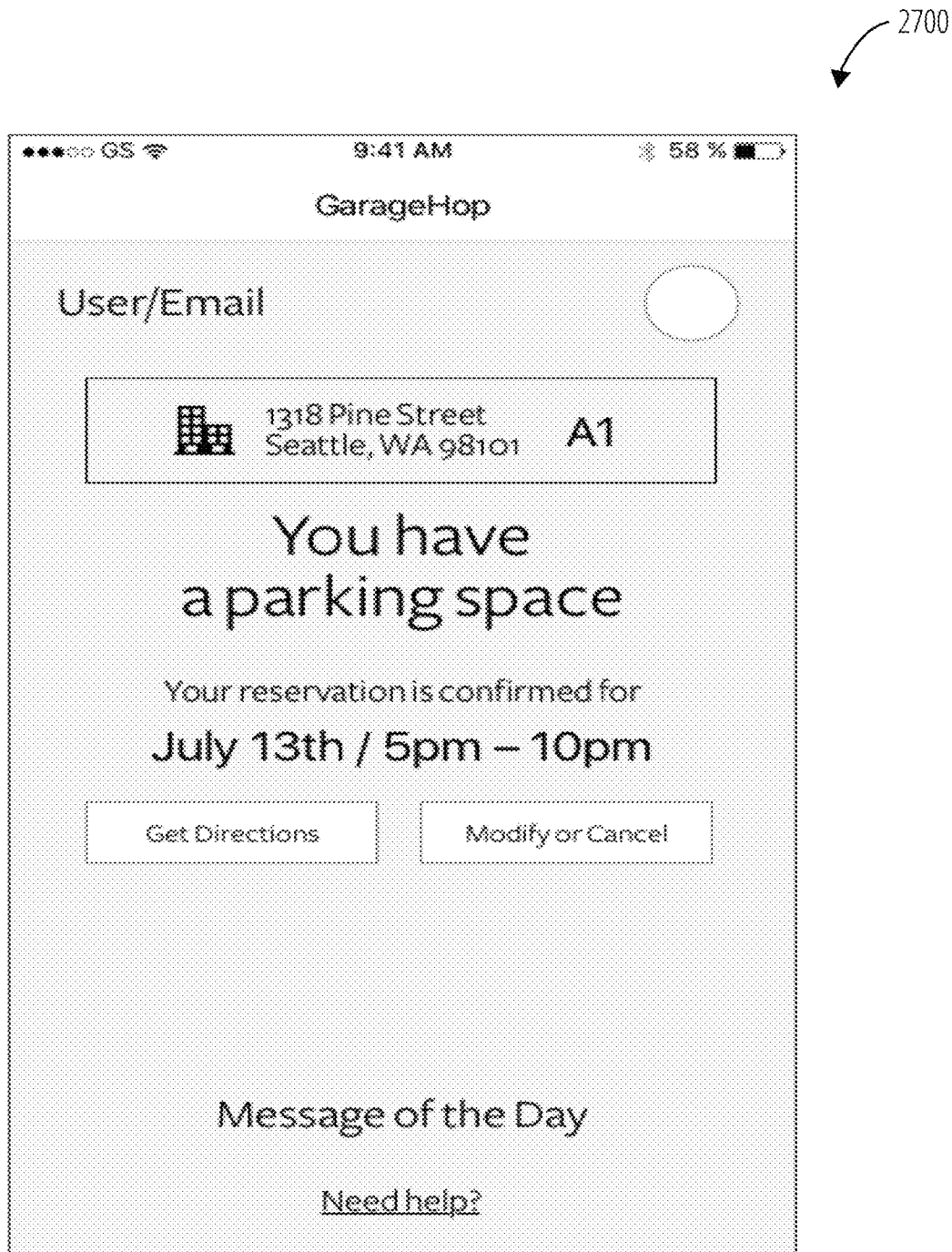
FIG. 27 illustrates an embodiment of a mobile communication device machine display 2700.
Figure 28:
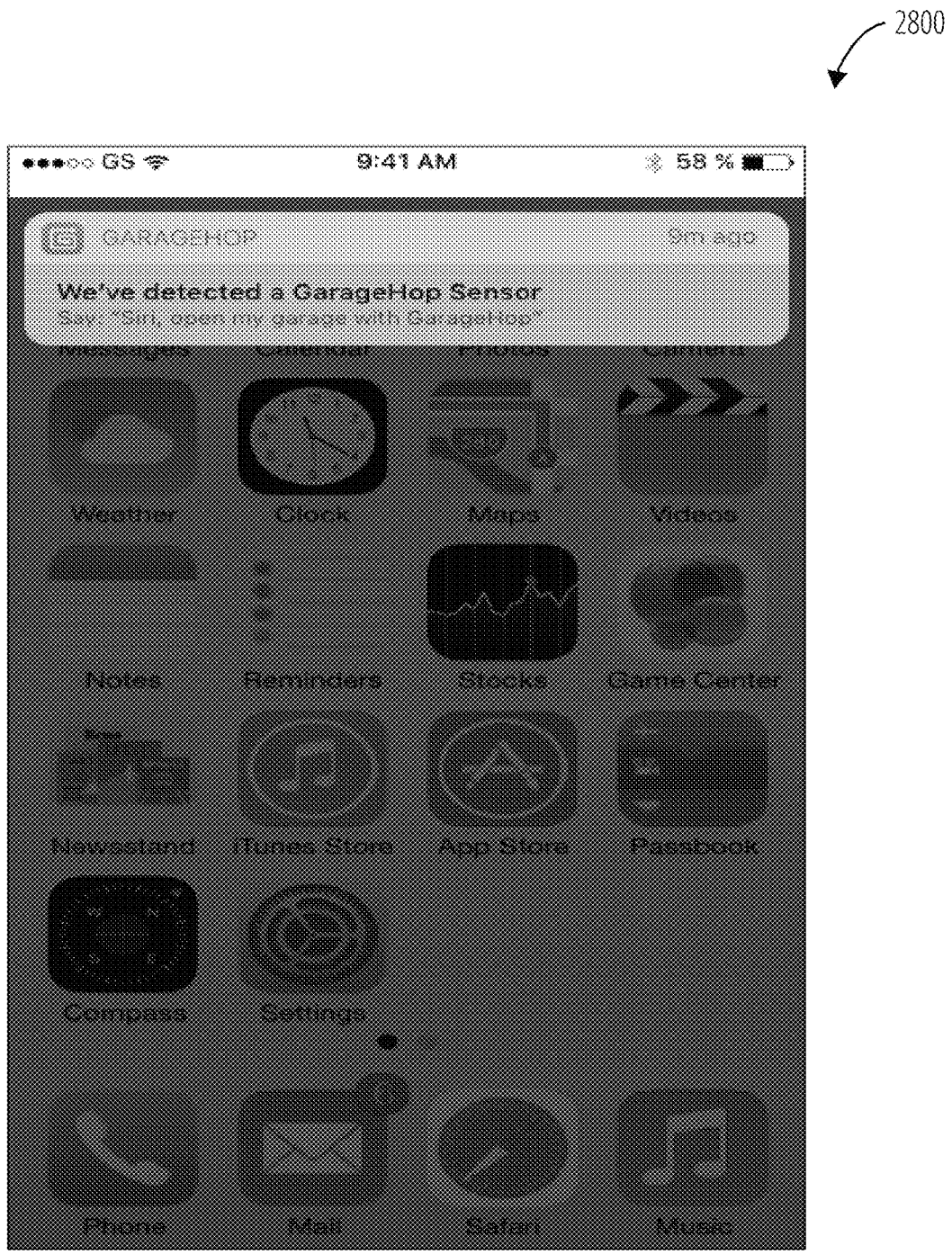
FIG. 28 illustrates an embodiment of a mobile communication device machine display 2800.
Figure 29:
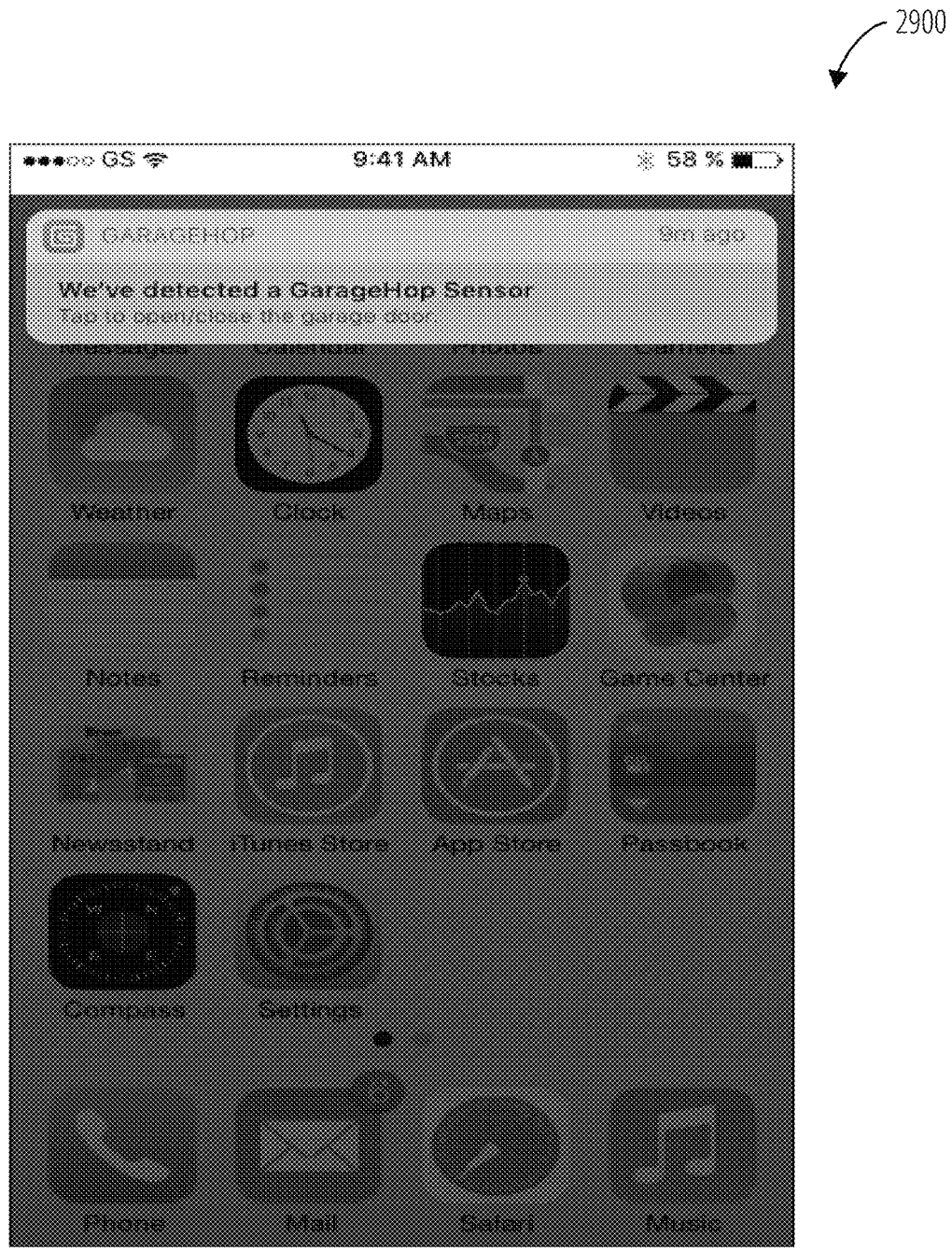
FIG. 29 illustrates an embodiment of a mobile communication device machine display 2900.
Figure 30:
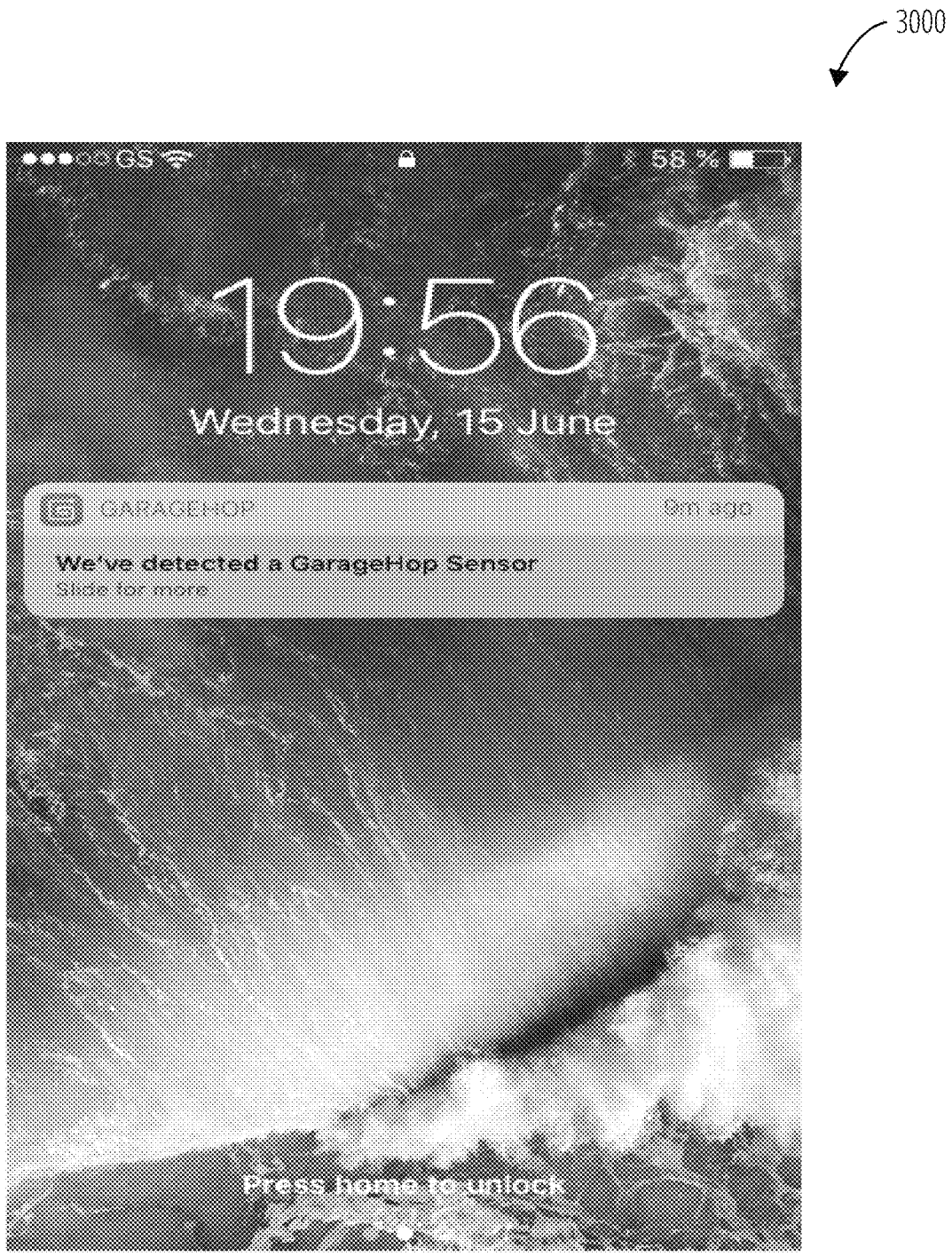
FIG. 30 illustrates an embodiment of a mobile communication device machine display 3000.

Referring to FIG. 23, the mobile communication device machine display 2300 comprises a location display 2202, an information activator 2304, and an authorization ticket indicator 2302.

The mobile communication device machine display 2300 may results from the selection of the reservation activator 2106. The authorization ticket indicator 2302 may display information regarding the selected reservation including parking pool name, location, parking space, etc.

The location display 2202 may display the location of the parking pool and the location of the mobile communication device.

The information activator 2304 may receive an input from the mobile communication device to alter the mobile communication device to display further information, such as map and navigation instructions.

Referring to FIG. 31, the lease schema 3100 may be utilized to incorporate complex lease scenarios including business parking for both employees and customers, carpooling, and valet/autonomous taxi services.

The following object are utilized in the lease schema 3100.

Group

A Group is a logical collection of one or more parkers and one or more leases. Some examples of groups are:
 Personal Group: an individual and one or more leases of one or more spaces in one or more garages.
 Carpool Group: two or more individuals and one or more leases of one or more spaces in one or more garages, costs split between the members of the group.

Business Group: a group of business employees or customers sharing a pool of parking spaces in one or more garages, either paid by the business or by costs split between members of the group.

Lease

A Lease is a collection of one or more spaces in one or more garages reserved for either 24 hours or a time slice (e.g. 7 AM to 5 PM, 6 PM to 6 AM, etc.

Parker

A Parker is a driver & car or autonomous vehicle which parks in a parking space.

Reservation

A Reservation is a limited duration hold on a parking space that allows a Parker to know that when he/she/it completes the travel to the parking garage, the parking space will still be available.

Space

A Space is a parking space in a parking garage.

Garage

A Garage is an access controlled facility that provides a pool of Parking Spaces to Parkers.

Sensor

A Sensor is a low power micro-controller, wireless transceiver, switch actuator, and power source that communicates with a Smart Phone or integral vehicle computing device to validate permissions and open garage access barriers.

The power source can be a battery, a solar cell, or a 'vampire' circuit that collects current from the garage barrier actuator's switch circuit.

LogEntry

A LogEntry is a record of access collected by the Sensor and transmitted by the vehicle computing device to the servers. The LogEntry collates the time, action (e.g. entry or exit, vehicle or pedestrian), Parker, Garage, and Sensor.

LeaseSpaceDetails

A LeaseSpaceDetails provides a mapping from Lease to Spaces with time slicing which allows one Space to be leased multiple times with chronological separation between leases.

Queries

The object model has been designed to support the following queries to enable the application scenarios:

What garages are available to a Parker (through an active lease)?
Which garages have an unused space available to a Parker?
What's the usage history for a Garage?
What's the usage history for a Parker?
What's the usage history for a Group?
What's the usage history for a Lease?
What's the current usage of a Garage?
What's the current usage of a Lease?

The objects above may be utilized to implement the following exemplary scenarios:

Business Parking

A gym recently expanded their facility. Due to property limitations, they made the hard call to expand their building floor space at the expense of their surface parking lot. Unfortunately, plans for an underground parking garage to compensate for the loss of surface parking fell through due to financial constraints.

Now they need to find a way for their 50 employees to park, so they decide to lease 20 monthly parking spaces in nearby apartment buildings. These 20 spaces are time shared between the 50 employees. Additionally, they advertise the monthly parking service to 100 of their customers who use the gym facilities 4 or more times a week, timesharing the spaces at a 4:1 ratio.

The leasing system is capable of handling both these scenarios. The gym purchases two leases, creating two pools of parking, one for employees and one for frequent customers, spanning multiple local apartment buildings. Employees and customers can see the real-time availability of both garages from their app. Employees and customers can reserve a space an hour ahead of time so they know their space will be there after they finish the commute. And employees and customers who use their mobile communications device's calendar to store the time and location of their shifts or workout sessions will be notified proactively to make a reservation using the mobile communications device notification system.

The billing system is capable of handling both types of payment. For the gym's employees, the lease is paid for in one payment by the gym itself. For the gym's customers, the cost of the parking spaces in the lease is aggregated and the payment split between the members of the lease.

Carpooling

The University of Washington incentivizes carpooling by charging less for park for cars with more occupants. Their daily rate for a single occupant vehicle is $15, for a double occupant vehicle is $7.50, and for three or more occupants is $5. Today this is enforced quarterly when the parking passes are purchased rather than on a day by day basis.

The application and sensor can detect the number of occupants of the vehicle in real time, bringing the ability to extend these carpool incentives to daily parking costs and increasing compliance. The sensor detects the mobile communications devices of each vehicle occupant (which must have the application installed and logged in).

Valet/Autonomous Taxi Service

An on-demand valet service provides doorstep parking services. Common scenarios include stadium events (park my car for me at an off-stadium lot) and daily commute (I stop at BigCorp HQ and the valet finds a parking space for me nearby).

The system provides a pool of spaces in a pool of garages throughout the area for the valets to use, like the business scenario of gym but geographically distributed throughout the city. Valet drivers can use this pool of garages, real time parking information, and space reservation system to increase the efficiency of their valet network.

Figure 32:
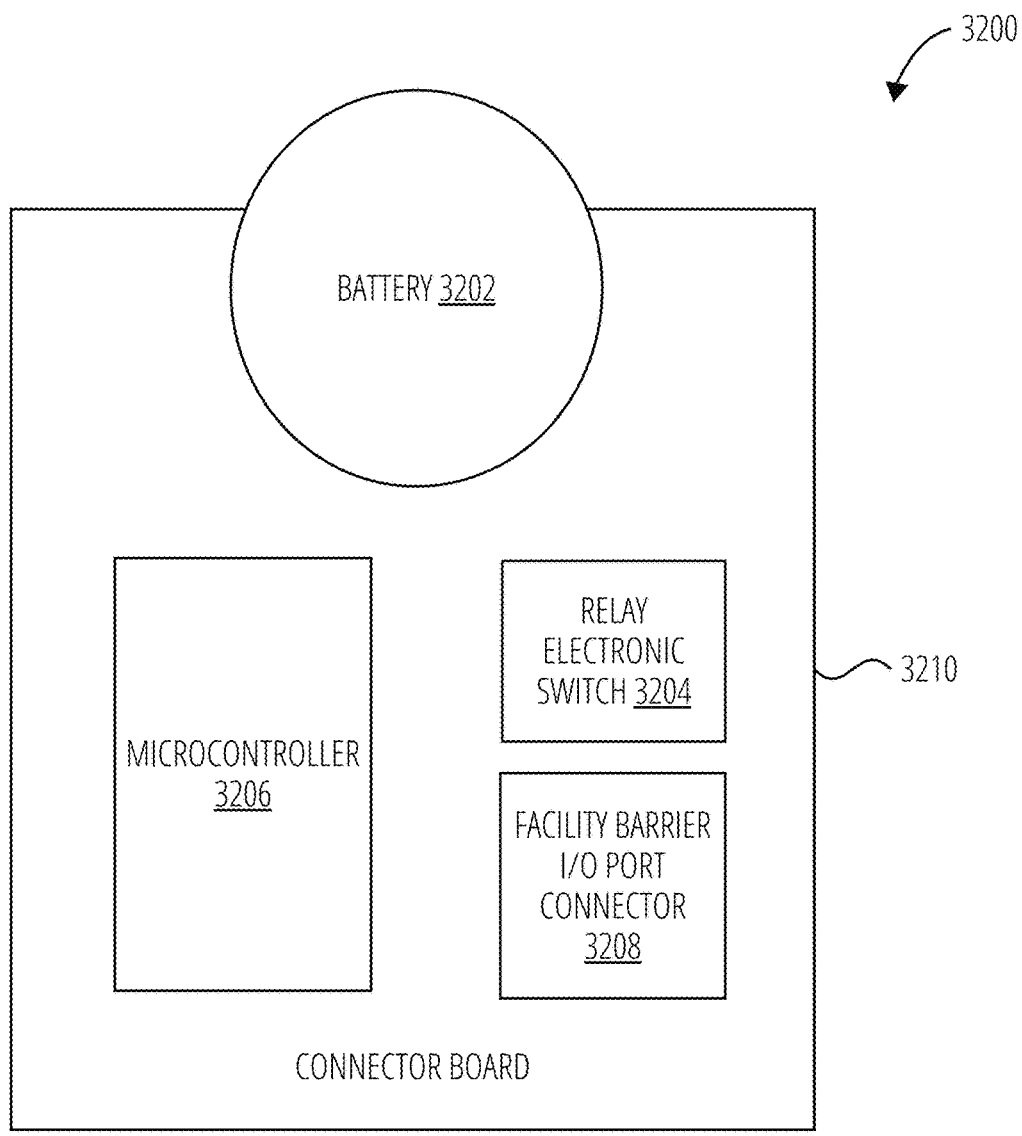
FIG. 32 illustrates an embodiment of a sensor system 3200.

Referring to FIG. 32, the sensor system 3200 comprises a battery 3202, a relay electronic switch 3204, a microcontroller 3206, a facility barrier I/O port connector 3208, and a connector board 3210.

The battery 3202 may provide electrical power to operate each of the other components of the sensor system 3200. In some embodiments, the battery 3202 may be a capacitor that may be recharged. Recharging may occur when the facility barrier is operated. The battery 3202 may be coupled to the connector board 3210.

The relay electronic switch 3204 may be utilized to signal a facility barrier to open or close. The relay electronic switch 3204 may receive instructions to signal to open or close form the microcontroller 3206 via the connector board 3210. The relay electronic switch 3204 may receive electrical power to operate from the battery 3202 via the connector board 3210. The relay electronic switch 3204 may utilize the facility barrier I/O port connector 3208 to send the signal with instruction to open or close to the facility barrier.

The microcontroller 3206 may receive and send signals to the mobile communication device. The microcontroller 3206 may utilize an antenna to send and receive RF signals. The microcontroller 3206 may further comprise a CPU, a control memory structure to store data, such as logs, I/O ports to communicate with other components of the sensor system 3200, a program/debug port, a power regulator, and a transceiver. The microcontroller 3206 may utilize the connector board 3210 to send signals to the relay electronic switch 3204 and the reporting service message queue 308 to open or close the facility barrier. The microcontroller 3206 may also send signals to the battery 3202 to regulate the power usage of the battery 3202.

The facility barrier I/O port connector 3208 may receive signals from the microcontroller 3206 via the connector board 3210 to open or close the facility barrier.

The sensor system connector board 3210 may provide connections to couple the components of the sensor system 3200: the battery 3202, the relay electronic switch 3204, the microcontroller 3206, and the facility barrier I/O port connector 3208.

What is claimed is:

1. A mobile communication device, comprising:
   a processor;
   an antenna;
   logic to interoperate with a location service via the antenna to detect proximity between the mobile communication device and a parking facility;
   logic to determine presence of a valid facility authorization ticket stored by the mobile communication device;
   logic to cross reference a location of the parking facility against an index of parking facility locations and an ID received via the antenna from transducers proximate to an entrance or exit of the parking facility;
   logic to detect proximity of a facility entrance sensor via the antenna in response to the valid facility authorization ticket being received, or in response to the valid facility authorization ticket determined to be present;
   logic to communicate via the antenna an entrance request to the facility entrance sensor, the entrance request comprising a driver ID, the valid facility authorization ticket, and a datetime value;
   logic to receive via the antenna a digitally signed entrance ticket to the parking facility;
   logic to receive from the facility entrance sensor via the antenna a queued log data, the queued log data comprising a subset of log entries by the facility entrance sensor, the subset of log entries stored in a local message queue; and
   logic to communicate to a reporting service via the antenna the queued log data as a result of previously unavailable wireless connectivity becoming available to the mobile communication device.

2. The mobile communication device of claim 1, further comprising:
   logic to communicate via the antenna a request to an authorization service to provide the valid facility authorization ticket and other facility data if presence of the valid facility authorization ticket is not detected; and
   logic to receive via the antenna the valid facility authorization ticket.

3. The mobile communication device of claim 1, the logic to interoperate with the location service via the antenna to detect proximity between the mobile communication device and the parking facility further comprising a geofence trigger.

4. The mobile communication device of claim 1, further comprising:

logic to determine the driver ID using an identity obtained from an operating system of the mobile communication device or an application level authentication system.

5. The mobile communication device of claim 1, the entrance request comprising instruction for the facility entrance sensor to store a log of the entry, including the driver ID, a ticket ID, and the datetime value.

6. The mobile communication device of claim 1, further comprising logic to communicate via the antenna clock updates to the facility entrance sensor.

7. The mobile communication device of claim 1, further comprising logic to form the entrance request to instruct the facility entrance sensor to associate the entrance ticket with multiple mobile communication devices.

8. A method of operating a mobile communication device, the method comprising:
   interoperate the mobile communication device with a location service via an antenna of the mobile communication device to detect proximity between the mobile communication device and a parking facility;
   determining presence of a valid facility authorization ticket stored by the mobile communication device;
   cross referencing a location of the parking facility against an index of parking facility locations and an ID received via the antenna from transducers proximate to an entrance or exit of the parking facility;
   detecting proximity of a facility entrance sensor via the antenna in response to the valid facility authorization ticket being received, or in response to the valid facility authorization ticket determined to be present;
   communicating via the antenna an entrance request to the facility entrance sensor, the entrance request comprising a driver ID, the valid facility authorization ticket, and a datetime value;
   receiving via the antenna a digitally signed entrance ticket to the parking facility;
   receiving from the facility entrance sensor via the antenna a queued log data, the queued log data comprising a subset of log entries by the facility entrance sensor, the subset of log entries stored in a local message queue; and
   communicating to a reporting service via the antenna the queued log data as a result of previously unavailable wireless connectivity becoming available to the mobile communication device.

9. The method of claim 8, further comprising:
   communicating via the antenna a request to an authorization service to provide the valid facility authorization ticket and other facility data if presence of the valid facility authorization ticket is not detected; and
   receiving via the antenna the valid facility authorization ticket.

10. The method of claim 8, wherein interoperating with the location service via the antenna to detect proximity between the mobile communication device and the parking facility further comprises detecting a geofence trigger.

11. The method of claim 8, further comprising:
    determining the driver ID using an identity obtained from an operating system of the mobile communication device or an application level authentication system.

12. The method of claim 8, the entrance request comprising instruction for the facility entrance sensor to store a log of the entry, including the driver ID, a ticket ID, and the datetime value.

13. The method of claim 8, further comprising communicating, via the antenna, clock updates to the facility entrance sensor.

14. The method of claim 8, further comprising forming the entrance request to instruct the facility entrance sensor to associate the entrance ticket with multiple mobile communication devices.

15. A non-transitory machine-readable storage medium, the machine-readable storage medium including instructions that when executed by a processor of a mobile communication device, cause the mobile communication device to:
- interoperate with a location service via an antenna of the mobile communication device to detect proximity between the mobile communication device and a parking facility;
- determine presence of a valid facility authorization ticket stored by the mobile communication device;
- cross reference a location of the parking facility against an index of parking facility locations and an ID received via the antenna from transducers proximate to an entrance or exit of the parking facility;
- detect proximity of a facility entrance sensor via the antenna in response to the valid facility authorization ticket being received, or in response to the valid facility authorization ticket determined to be present;
- communicate via the antenna an entrance request to the facility entrance sensor, the entrance request comprising a driver ID, the valid facility authorization ticket, and a datetime value;
- receive via the antenna a digitally signed entrance ticket to the parking facility;
- receiving from the facility entrance sensor via the antenna a queued log data, the queued log data comprising a subset of log entries by the facility entrance sensor, the subset of log entries stored in a local message queue; and
- communicating to a reporting service via the antenna the queued log data as a result of previously unavailable wireless connectivity becoming available to the mobile communication device.

16. The machine-readable storage medium of claim 15, wherein the instructions, when executed by the processor, further cause the mobile communication device to:
- communicate via the antenna a request to an authorization service to provide the valid facility authorization ticket and other facility data if presence of the valid facility authorization ticket is not detected; and
- receive via the antenna the valid facility authorization ticket.

17. The machine-readable storage medium of claim 15, wherein interoperating with the location service via the antenna to detect proximity between the mobile communication device and the parking facility further comprises detect a geofence trigger.

18. The machine-readable storage medium of claim 15, wherein the instructions, when executed by the processor, further cause the mobile communication device to:
- determine the driver ID using an identity obtained from an operating system of the mobile communication device or an application level authentication system.

* * * * *